US011970127B2

(12) United States Patent
Hioda et al.

(10) Patent No.: US 11,970,127 B2
(45) Date of Patent: Apr. 30, 2024

(54) VEHICLE PASSENGER SEAT AIRBAG DEVICE

(71) Applicant: TOYOTA JIDOSHA KABUSHIKI KAISHA, Toyota (JP)

(72) Inventors: Seiji Hioda, Tokai (JP); Toshimitsu Negishi, Okazaki (JP); Kazuma Suzuki, Yatomi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/070,645

(22) Filed: Nov. 29, 2022

(65) Prior Publication Data
US 2023/0234531 A1 Jul. 27, 2023

(30) Foreign Application Priority Data
Jan. 24, 2022 (JP) ................ 2022-008986

(51) Int. Cl.
*B60R 21/206* (2011.01)
*B60R 21/16* (2006.01)
(Continued)

(52) U.S. Cl.
CPC ........ *B60R 21/206* (2013.01); *B60R 21/2338* (2013.01); *B60R 21/261* (2013.01); (Continued)

(58) Field of Classification Search
CPC . B60R 21/206; B60R 21/2338; B60R 21/261; B60R 2021/161; B60R 2021/23382
See application file for complete search history.

(56) References Cited

U.S. PATENT DOCUMENTS

| 3,788,665 A | 1/1974 | Noll et al. |
| 5,577,765 A | 11/1996 | Takeda et al. |

(Continued)

FOREIGN PATENT DOCUMENTS

| JP | 52-005127 B1 | 2/1977 |
| JP | 08-072661 A | 3/1996 |

(Continued)

OTHER PUBLICATIONS

JP-2022178228-A (including machine translation) (Year: 2022).*
JP-2011143805-A (including machine translation) (Year: 2011).*
English translation of WO-2013041406-A1 (Year: 2013).*

*Primary Examiner* — Jason D Shanske
*Assistant Examiner* — Joselynn Y Sliteris
(74) *Attorney, Agent, or Firm* — Dinsmore & Shohl LLP

(57) ABSTRACT

A vehicle passenger seat airbag device includes: an airbag main body that is stored on a lower side of an instrument panel and that is partitioned by an upper partition member to a lower chamber that restrains lower limbs of an occupant and an upper chamber that restrains an upper body of the occupant; and a flow straightening cylinder that is provided so as to be passed through the upper partition member inside the airbag main body and that distributes gas ejected from an inflator to the lower chamber and the upper chamber. The flow straightening cylinder is provided such that a sectional shape of at least a region passing through the upper partition member is provided in a flat shape with its longitudinal direction in a vehicle width direction when the flow straightening cylinder expands and deploys due to ejection of the gas.

7 Claims, 13 Drawing Sheets

(51) Int. Cl.
*B60R 21/2338* (2011.01)
*B60R 21/261* (2011.01)

(52) U.S. Cl.
CPC .............. *B60R 2021/161* (2013.01); *B60R 2021/23382* (2013.01)

(56) References Cited

U.S. PATENT DOCUMENTS

| | | | | |
|---|---|---|---|---|
| 6,059,312 | A * | 5/2000 | Staub | B60R 21/2338 280/743.1 |
| 6,086,092 | A * | 7/2000 | Hill | B60R 21/233 280/743.2 |
| 6,752,417 | B2 * | 6/2004 | Takimoto | B60R 21/206 280/753 |
| 7,762,577 | B2 * | 7/2010 | Kato | B60R 21/206 280/752 |
| 8,215,665 | B2 * | 7/2012 | Ohara | B60R 21/2346 280/740 |
| 8,480,122 | B2 * | 7/2013 | Ohara | B60R 21/205 280/729 |
| 2011/0285114 | A1 | 11/2011 | Ohara et al. | |

FOREIGN PATENT DOCUMENTS

| | | | |
|---|---|---|---|
| JP | 2011-063138 A | | 3/2011 |
| JP | 2011-110994 A | | 6/2011 |
| JP | 2011143805 A | * | 7/2011 |
| JP | 2015-217719 A | | 12/2015 |
| JP | 2022178228 A | * | 12/2022 |
| WO | 2011/010386 A1 | | 1/2011 |
| WO | WO-2013041406 A1 | * | 3/2013 ........... B60R 21/206 |

* cited by examiner

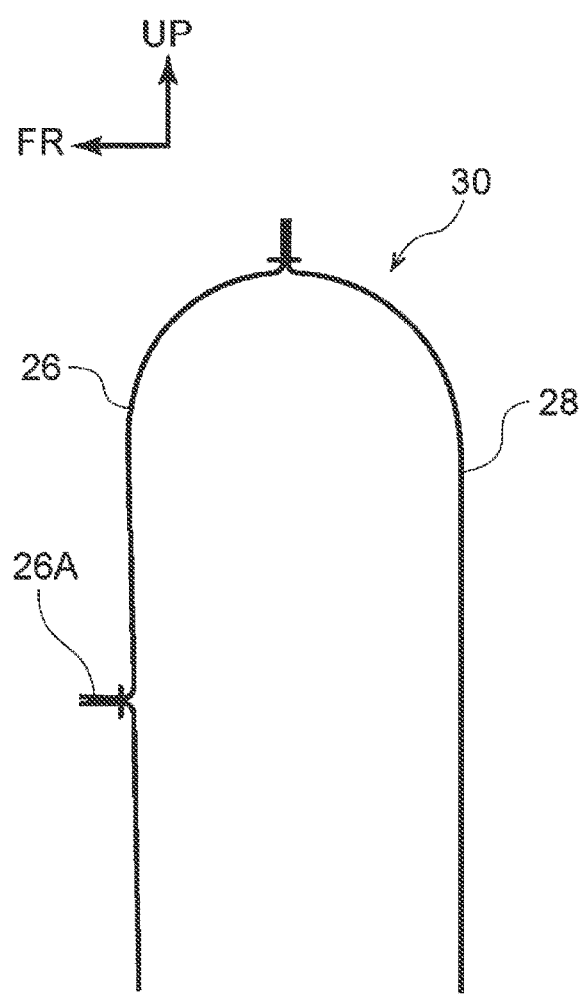 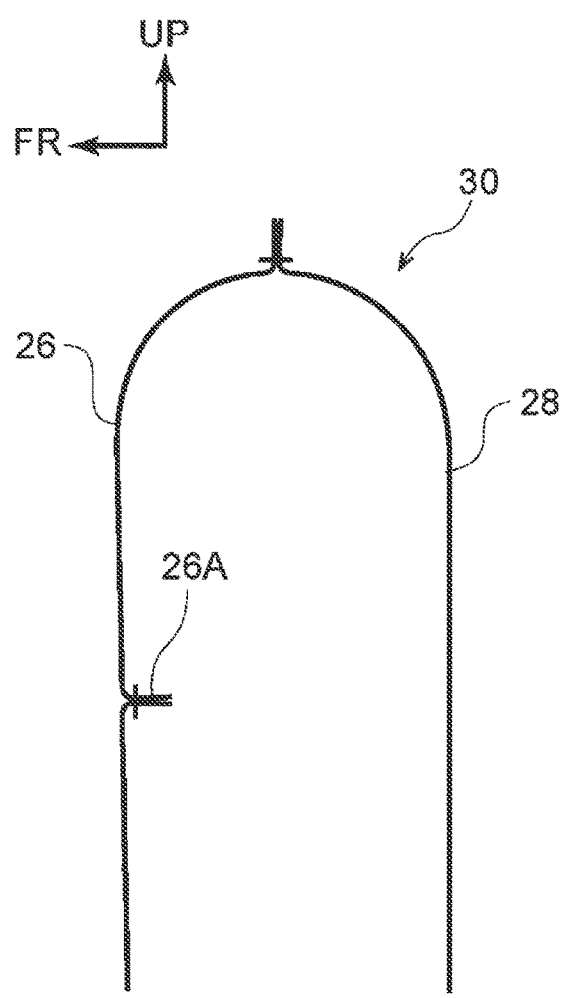

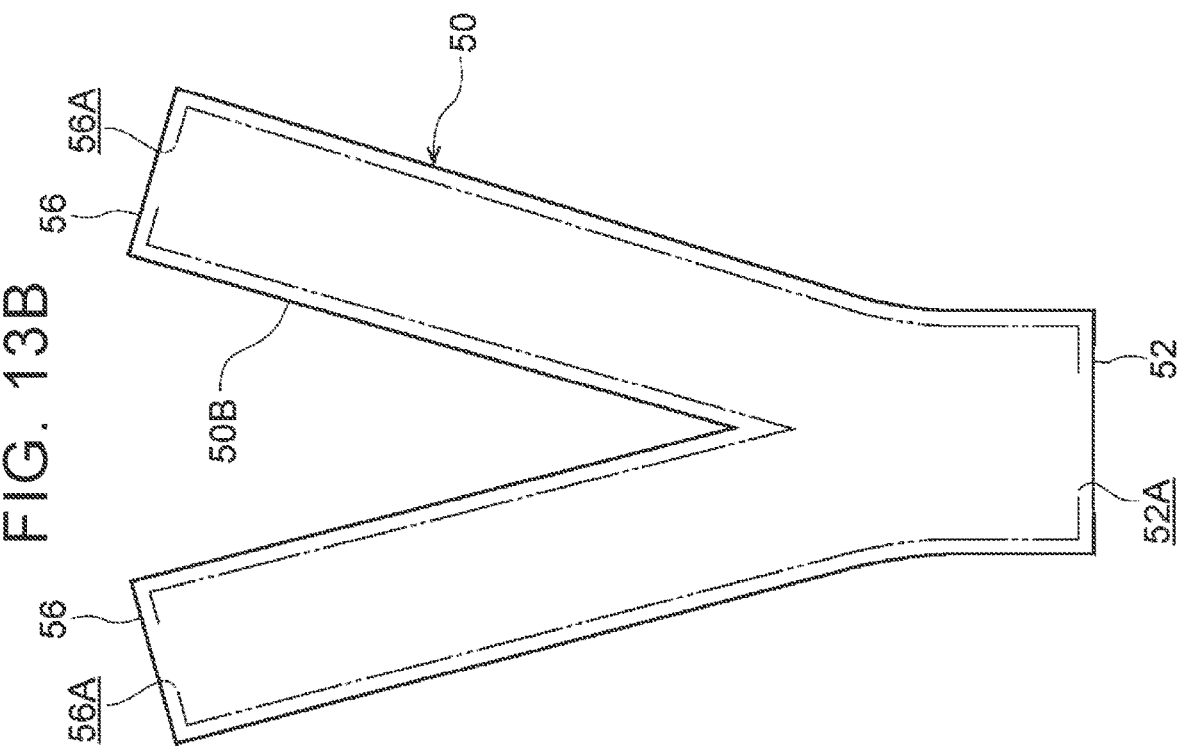
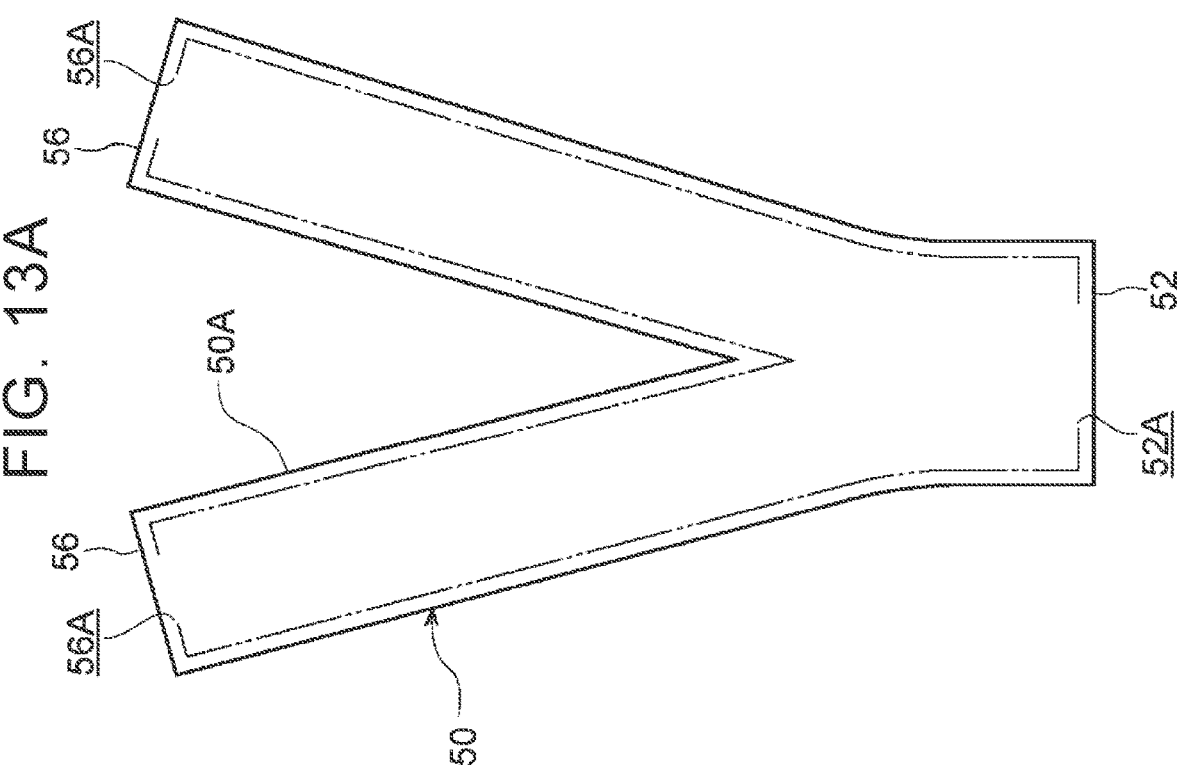

VEHICLE PASSENGER SEAT AIRBAG DEVICE

CROSS-REFERENCE TO RELATED APPLICATION

This application claims priority to Japanese Patent Application No. 2022-008986 filed on Jan. 24, 2022, incorporated herein by reference in its entirety.

BACKGROUND

1. Technical Field

The present disclosure relates to a vehicle passenger seat airbag device.

2. Description of Related Art

A structure in which a passenger seat airbag device integrally equipped with a knee cushion and a torso cushion is stored on the lower side of the instrument panel has been conventionally known (see, for example, Japanese Examined Patent Publication No. 52-005127 (JP 52-005127 B)). A passenger seat airbag device in which a passenger seat airbag and an inflator are stored inside a lower cover of the instrument panel, and a tubular baffle that allows gas to escape to the side and a knee cushion are provided inside the airbag is also conventionally known (see, for example, Japanese Unexamined Patent Application Publication No. 08-072661 (JP 08-072661 A)).

SUMMARY

In recent years, thinner instrument panels have become a trend in terms of design. However, in that case, to obtain the conventional lower limb restraint performance in the event of a frontal collision of the vehicle, a large knee airbag that fills the gap between the lower surface of the instrument panel distant from the occupant and the knee of the occupant is required, and the increase in the manufacturing cost and weight is an issue. Therefore, the passenger seat airbag in which an airbag for the upper body including the head (upper chamber) and a knee airbag (lower chamber) are integrally provided has been considered to be configured simply with a plane panel.

However, when the integral three-dimensional airbag shape that restrains the upper body including the head and the lower limb is simply composed of a plane panel, the occupant restraint surface is tilted rearwards. Since the surface opposite the occupant restraint surface (instrument panel side) does not come into contact with the front windshield glass (since the reaction force from the front windshield glass cannot be obtained), the deployment behavior of the passenger seat airbag becomes unstable.

As a method of suppressing the deployment behavior of the passenger seat airbag from becoming unstable, it is conceivable that a flow straightening cylinder with a circular section for distributing gas to the upper chamber and the lower chamber is provided inside the airbag and the flow straightening cylinder is formed into a curved shape along the outer shape of the rear surface of the instrument panel. However, when such a flow straightening cylinder is provided, for example, in the case of a three-year-old child occupant, the amount of contact through the airbag with the flow straightening cylinder having a high internal pressure (the amount of interference overlapping in the vehicle front-rear direction as seen from the vehicle width direction) increases, and thus a load more than necessary may be applied to the child occupant.

In view of this, an object of the present disclosure is to obtain a vehicle passenger seat airbag device capable of suppressing a load more than necessary from being applied to a child occupant.

In order to achieve the above object, a vehicle passenger seat airbag device according to a first aspect of the present disclosure includes: an airbag main body that is stored on a lower side of an instrument panel located in front of an area from a knee to a shin of an occupant seated in a passenger seat of a vehicle, and that is partitioned by an upper partition member into a lower chamber that restrains a lower limb of the occupant and an upper chamber that restrains an upper body of the occupant; and a flow straightening cylinder that is provided so as to be passed through the upper partition member inside the airbag main body and that distributes gas ejected from an inflator to the lower chamber and the upper chamber. The flow straightening cylinder is provided such that a sectional shape of at least a region passing through the upper partition member is provided in a flat shape with its longitudinal direction in a vehicle width direction when the flow straightening cylinder expands and deploys due to ejection of the gas.

In the disclosure according to the first aspect, in the event of a frontal collision of the vehicle, the inflator is activated, and the gas ejected from the inflator is distributed to the lower chamber and the upper chamber of the airbag main body through the flow straightening cylinder. The lower limb of the occupant is restrained by the lower chamber of the airbag main body, and the upper body of the occupant is restrained by the upper chamber of the airbag main body. The "occupant" in the present disclosure is an adult occupant corresponding to the human body dummy AM50 (hereinafter referred to as "adult").

Further, the flow straightening cylinder, which distributes the gas ejected from the inflator to the lower chamber and the upper chamber of the airbag main body, is provided such that a sectional shape of at least a region passing through the upper partition member is provided in a flat shape with its longitudinal direction in a vehicle width direction when the flow straightening cylinder expands and deploys due to ejection of the gas. Here, for example, for an occupant of a child equivalent to a three-year-old, the chest faces a position corresponding to the upper partition member.

Since the sectional shape of at least the region that passes through the upper partition member of the flow straightening cylinder is formed in a flat shape with its longitudinal direction in the vehicle width direction, and the thickness in the front-rear direction is reduced, the amount of contact of the child occupant through the airbag main body with the flow straightening cylinder having a high internal pressure (the amount of interference) is reduced. This suppresses a load more than necessary from being applied to the child occupant, and the injury value for the chest and neck of the child occupant is reduced.

The vehicle passenger seat airbag device according to a second aspect is a vehicle passenger seat airbag device according to the first aspect, in which the lower chamber is partitioned into a first lower chamber and a second lower chamber by a lower partition member, and the flow straightening cylinder is also provided so as to be passed through the lower partition member, and such that a sectional shape of a region passing through the lower partition member is provided in a flat shape with its longitudinal direction in the vehicle width direction.

In the disclosure according to the second aspect, the lower chamber is partitioned into a first lower chamber and a second lower chamber by a lower partition member. Further, the flow straightening cylinder is also provided so as to be passed through the lower partition member, and such that a sectional shape of a region passing through the lower partition member is provided in a flat shape with its longitudinal direction in the vehicle width direction. That is, the thickness of the flow straightening cylinder in the vehicle front-rear direction in the region passing through the lower partition member is reduced. Therefore, even in the case of a smaller child occupant whose chest faces a position corresponding to the lower partition member, the amount of contact through the airbag main body with the flow straightening cylinder having a high internal pressure (the amount of interference) is reduced. This suppresses a load more than necessary from being applied to the child occupant, and the injury value for the chest and neck of the child occupant is reduced.

The vehicle passenger seat airbag device according to a third aspect is a vehicle passenger seat airbag device according to the first or second aspect, in which the flow straightening cylinder is provided in the flat shape by a tether that regulates a thickness in a vehicle front-rear direction.

In the disclosure according to third aspect, the flow straightening cylinder is provided in the flat shape by a tether that regulates a thickness in a vehicle front-rear direction. Therefore, the flat shape is easily formed as compared with the case where the flow straightening cylinder is formed in a flat shape by a method other than the tether.

A vehicle passenger seat airbag device according to a fourth aspect of the present disclosure includes: an airbag main body that is stored on a lower side of an instrument panel located in front of an area from a knee to a shin of an occupant seated in a passenger seat of a vehicle, and that is partitioned by an upper partition member into a lower chamber that restrains a lower limb of the occupant and an upper chamber that restrains an upper body of the occupant; and a flow straightening cylinder that is provided so as to be passed through the upper partition member inside the airbag main body and that distributes gas ejected from an inflator to the lower chamber and the upper chamber. The flow straightening cylinder is provided in a substantial "Y" shape in front view such that an upper portion branched in a vehicle width direction is disposed in a position facing both knees of the occupant when the flow straightening cylinder expands and deploys due to ejection of the gas.

In the disclosure according to the fourth aspect, in the event of a frontal collision of the vehicle, the inflator is activated, and the gas ejected from the inflator is distributed to the lower chamber and the upper chamber of the airbag main body through the flow straightening cylinder. The lower limb of the occupant is restrained by the lower chamber of the airbag main body, and the upper body of the occupant is restrained by the upper chamber of the airbag main body. The "occupant" in the present disclosure is an adult occupant corresponding to the human body dummy AM50.

Further, the flow straightening cylinder that distributes the gas ejected from the inflator to the lower chamber and the upper chamber of the airbag main body is formed in a substantial "Y" shape in front view so that the upper portion branched in the vehicle width direction is disposed in a position facing both knees of the occupant when the flow straightening cylinder is expanded and deployed by the ejection of the gas. Here, for example, in the child occupant corresponding to the human body dummy of a three-year-old child, the chest faces a position corresponding to the upper partition member. That is, the chest of the child occupant faces a position corresponding to the area between the flow straightening cylinder branched in the vehicle width direction.

Therefore, as compared with the case where the flow straightening cylinder is not branched in the vehicle width direction, the amount of contact of the child occupant through the airbag main body with the flow straightening cylinder having a high internal pressure (the amount of interference) is reduced. This suppresses a load more than necessary from being applied to the child occupant, and the injury value for the chest and neck of the child occupant is reduced.

The vehicle passenger seat airbag device according to a fifth aspect is a vehicle passenger seat airbag device according to the fourth aspect, in which the lower chamber is partitioned into a first lower chamber and a second lower chamber by a lower partition member, and the flow straightening cylinder is provided so as to be passed through a pair of right and left openings provided in the upper partition member and so as to be passed through a single opening provided in the lower partition member.

In the disclosure according to the fifth aspect, the lower chamber is partitioned into a first lower chamber and a second lower chamber by a lower partition member. Further, the flow straightening cylinder is provided so as to be passed through a pair of right and left openings provided in the upper partition member and so as to be passed through a single opening provided in the lower partition member. That is, the position of the flow straightening cylinder is regulated by the upper partition member and the lower partition member. This can suppress the deployment behavior of the flow straightening cylinder from becoming unstable when the gas is supplied instantaneously to expand and deploy the flow straightening cylinder.

The vehicle passenger seat airbag device according to the sixth aspect is a vehicle passenger seat airbag device according to the fourth or fifth aspect, in which the upper chamber is provided with a holding member including through holes through which upper end portions of the flow straightening cylinder are inserted.

In the disclosure according to the sixth aspect, the upper chamber is provided with a holding member including through holes through which upper end portions of the flow straightening cylinder are inserted. This can suppress the deployment behavior of the upper end portions of the flow straightening cylinder from becoming unstable when the gas is supplied instantaneously to expand and deploy the flow straightening cylinder.

The vehicle passenger seat airbag device according to a seventh aspect is a vehicle passenger seat airbag device according to any one of the fourth to sixth aspects, in which the flow straightening cylinder is configured by superimposing two sheets of base fabric provided in a substantial "Y" shape in front view and sewing a perimeter except for gas vents.

In the disclosure according to the seventh aspect, the flow straightening cylinder is configured by superimposing two sheets of base fabric provided in a substantial "Y" shape in front view and sewing a perimeter except for gas vents. This simplifies the manufacturing process of the flow straightening cylinder and reduces its manufacturing cost.

The vehicle passenger seat airbag device according to an eighth aspect is a vehicle passenger seat airbag device according to any one of the first to seventh aspects, in which the flow straightening cylinder is provided so as to form a curved shape along an outer shape of a rear surface of the instrument panel when the flow straightening cylinder expands and deploys due to the ejection of the gas.

In the disclosure according to the eighth aspect, the flow straightening cylinder is provided so as to form a curved shape along an outer shape of a rear surface of the instrument panel when the flow straightening cylinder expands and deploys due to the ejection of the gas. Accordingly, the instrument panel side of the expanded and deployed airbag main body is disposed along the outer shape of the rear surface of the instrument panel and comes into contact with the front windshield glass. Therefore, even if the airbag main body for the passenger seat having the lower chamber and the upper chamber becomes larger due to the thinner size of the instrument panel, the deployment behavior of the airbag main body is suppressed from becoming unstable.

The vehicle passenger seat airbag device according to a ninth aspect is a vehicle passenger seat airbag device according to any one of the first to eighth aspects, in which the airbag main body includes a first plane panel disposed on an instrument panel side and a second plane panel disposed on an occupant side, and a circumference along a vertical direction of the first plane panel is set to be shorter than a circumference along a vertical direction of the second plane panel.

In the disclosure according to the ninth aspect, the airbag main body includes a first plane panel disposed on an instrument panel side and a second plane panel disposed on an occupant side, and a circumference along a vertical direction of the first plane panel is set to be shorter than a circumference along a vertical direction of the second plane panel. Accordingly, the instrument panel side of the expanded and deployed airbag main body is disposed along the outer shape of the rear surface of the instrument panel and comes into contact with the front windshield glass. Therefore, even if the airbag main body for the passenger seat having the lower chamber and the upper chamber becomes larger due to the thinner size of the instrument panel, the deployment behavior of the airbag main body is suppressed from becoming unstable.

As described above, according to the present disclosure, the vehicle passenger seat airbag device can suppress a load more than necessary from being applied to the child occupant.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6A is a schematic side sectional view showing a partially enlarged airbag main body of the vehicle passenger seat airbag device according to the first embodiment;

FIG. 6B is a schematic side sectional view showing a partially enlarged modification of the airbag main body of the vehicle passenger seat airbag device according to the first embodiment;

FIG. 13A is a front view showing the first plane panel constituting the flow straightening cylinder of the vehicle passenger seat airbag device according to the second embodiment; and FIG. 13B is a front view showing the second plane panel constituting the flow straightening cylinder of the vehicle passenger seat airbag device according to the second embodiment.

DETAILED DESCRIPTION OF EMBODIMENTS

Hereinafter, an embodiment according to the present disclosure will be described in detail with reference to the drawings. For convenience of description, the arrow UP, the arrow FR, and the arrow RH appropriately shown in the figures indicate the upward direction of a vehicle, the forward direction of the vehicle, and the right direction of the vehicle, respectively. Thus, when terms indicating directions, i.e., upward and downward, forward and rearward, and right and left are used in the following description without any specification, these mean upward and downward of the vehicle, forward and rearward of the vehicle, and right and left of the vehicle. Further, the right-left direction is synonymous with a vehicle width direction.

First Embodiment

Figure 1:
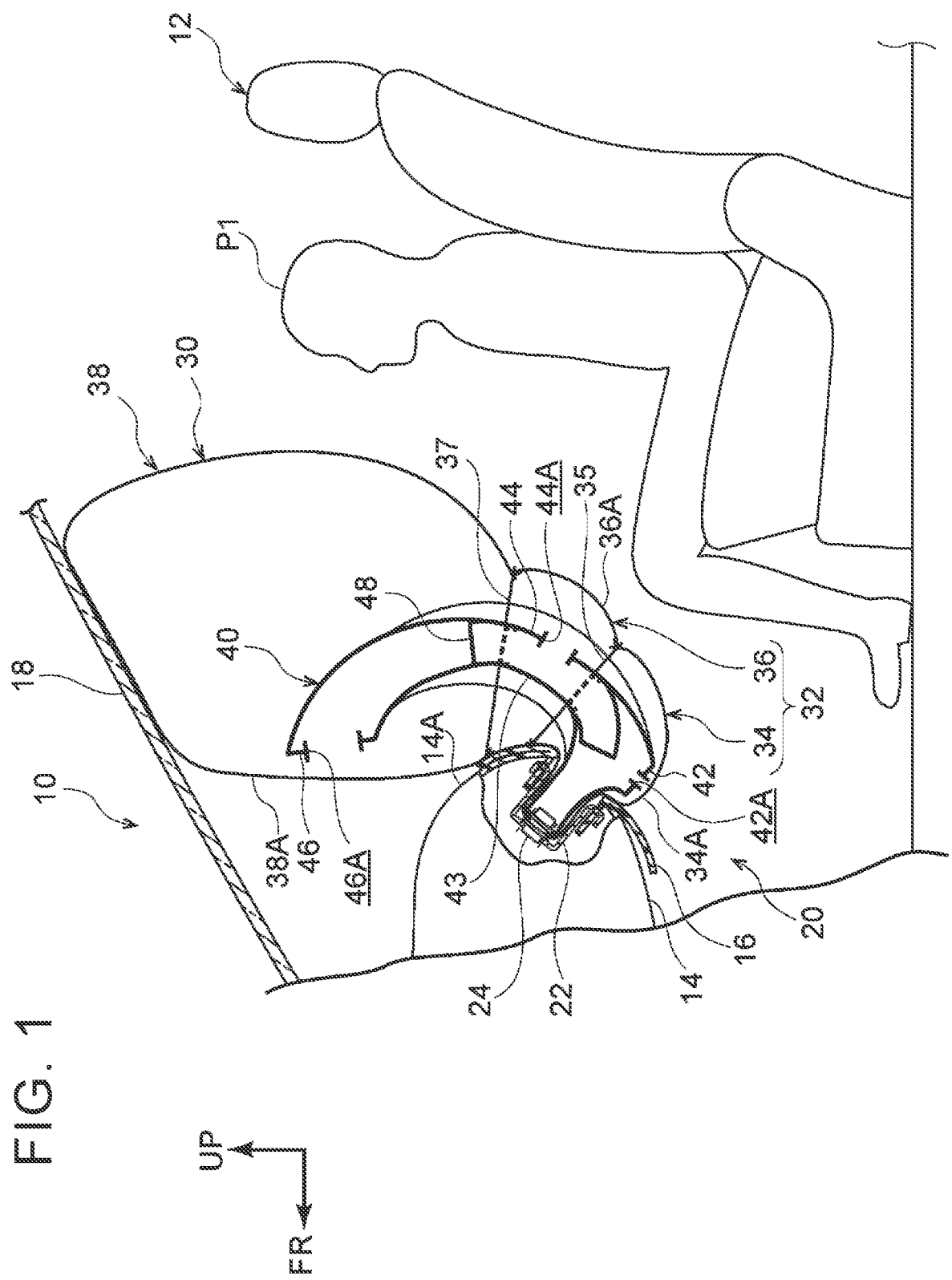
FIG. 1 is a schematic side view showing a vehicle passenger seat airbag device according to a first embodiment with a child occupant seated in a passenger seat.

First, a first embodiment will be described. As shown in FIG. 1, a vehicle passenger seat airbag device (hereinafter referred to as the "airbag device") 20 according to the first embodiment is provided in a right-hand drive vehicle 10 as an example. That is, the airbag device 20 is stored on the lower side of a resin instrument panel 14 (inside a door portion 16 described later) located in front of an area from the knee to the shin of an occupant P1 seated in a passenger seat 12, which is the left front seat of the vehicle 10.

The airbag device 20 includes an airbag main body 30 made of fabric supported on a support member 22 provided on the lower side (inside the door portion 16) of the instrument panel 14 and stored in a folded state, and a single inflator 24 that is supported on the support member 22 and that instantaneously ejects (supplies) gas to the inside of the airbag main body 30. In FIG. 1, in order to show the shape of the airbag main body 30 that has expanded and deployed, the occupant P1 seated in the passenger seat 12 is deliberately drawn away from the airbag main body 30.

The inflator 24 is electrically connected to a detection device (not shown) such as an acceleration sensor provided in the vehicle 10, and is activated when the detection device detects a frontal collision of the vehicle 10 to instantaneously eject gas. Further, the door portion 16 that is broken and opened by the airbag main body 30 that expands and deploys with the activation of the inflator 24 is integrally provided on the lower side of the instrument panel 14, and in FIG. 1, the door portion 16 in the broken state is shown.

Figure 2:
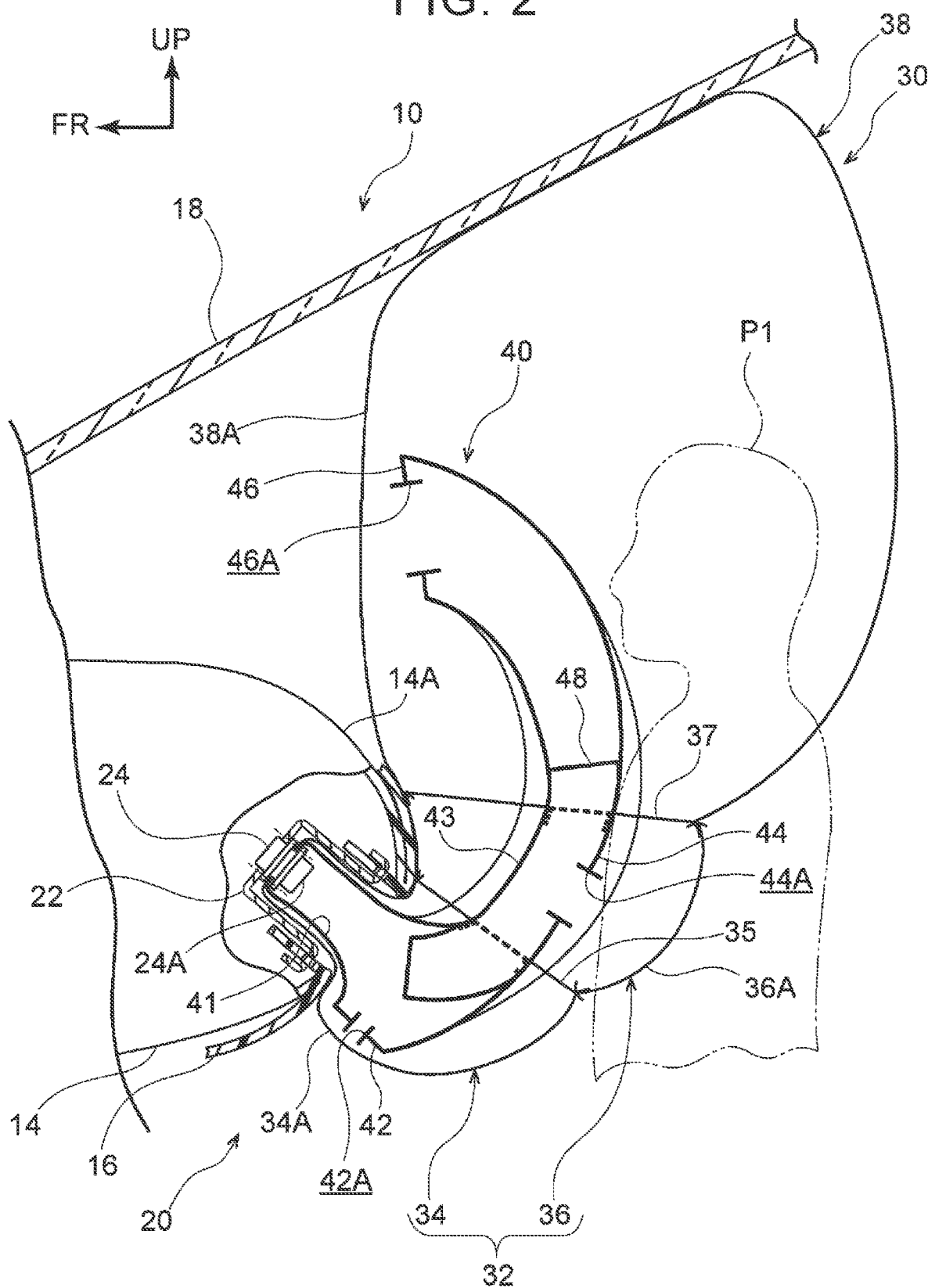
FIG. 2 is a schematic side view shown by enlarging the vehicle passenger seat airbag device according to the first embodiment.

As shown in FIGS. 1 and 2, the airbag main body 30 is partitioned into a lower chamber 32 that restrains the lower limb of the occupant P1 and an upper chamber 38 that restrains the upper body including the head of the occupant P1 by an upper partition member 37 made of fabric described later. That is, the airbag main body 30 is configured by integrating an airbag for the upper body (upper chamber 38) and a knee airbag (lower chamber 32). The width of the airbag main body 30 (length along the right-left direction) is considered to be a width that protrudes outward in the right-left direction from both knees of an adult occupant P2 (see FIG. 11).

The lower chamber 32 is further partitioned into an upper portion and a lower portion by a lower partition member 35 made of fabric described later. That is, the lower chamber 32 is partitioned into a first lower chamber 34 on the lower side and a second lower chamber 36 on the upper side by the lower partition member 35. Note that the first lower chamber 34 functions as the knee airbag of the child occupant P1 shown in FIG. 1 (for example, the occupant corresponding to the human body dummy of a 3-year-old child), and the second lower chamber 36 functions as the knee airbag of the adult occupant P2 shown in FIG. 9 (for example, the occupant corresponding to the human body dummy AM50).

In other words, the first lower chamber 34 below the lower partition member 35 faces the knee of the child occupant P1 in the substantially front-rear direction, and the second lower chamber 36 between the lower partition member 35 and the upper partition member 37 faces the knee of the adult occupant P2 in the substantially front-rear direction. The upper partition member 37 faces the chest of the child occupant P1 in the substantially front-rear direction. A vent hole through which gas is discharged after restraining the lower limb of the occupant P1 is not provided in the lower chamber 32, but a vent hole (not shown) through which the gas is discharged after restraining the upper body of the occupant P1 and the occupant P2 is provided on a wall surface on the right and left sides of the upper chamber 38.

Further, inside the airbag main body 30, a flow straightening cylinder 40 made of fabric is provided to distribute the gas ejected from the inflator 24 to the lower chamber 32 (first lower chamber 34 and second lower chamber 36), and the upper chamber 38. The flow straightening cylinder 40 is provided so as to form a substantially cylindrical shape (including a substantially elliptical cylindrical shape) in plan view except for a part (region described later) when expanded and deployed due to the ejection of the gas, and is provided so as to form a curved shape along the outer shape of a rear surface 14A of the instrument panel 14 in side view seen from the vehicle width direction.

Figure 3:
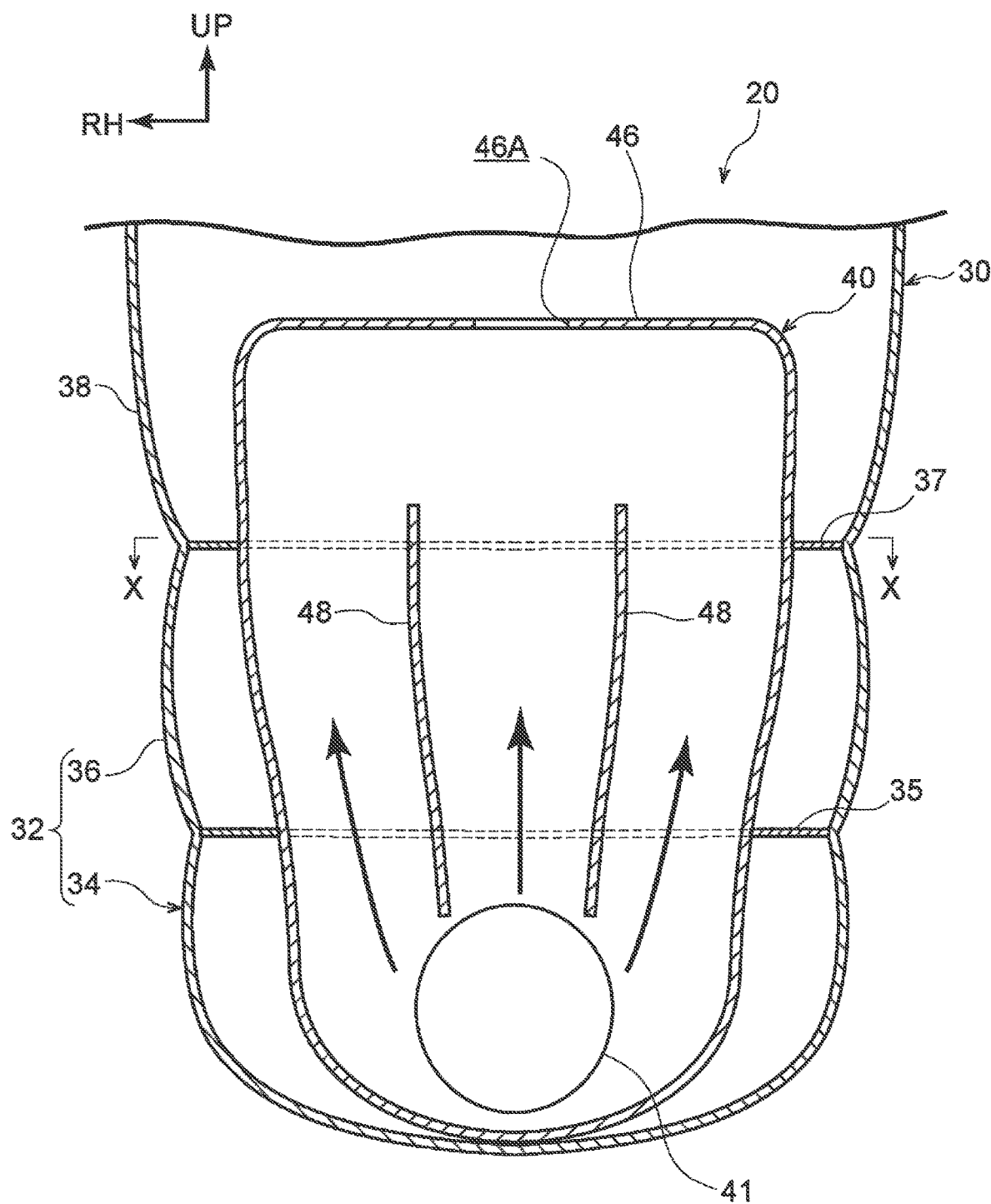
FIG. 3 is a schematic front sectional view showing an airbag main body and a flow straightening cylinder of the vehicle passenger seat airbag device according to the first embodiment.

As shown in FIGS. 2 and 3, a supply port 41 that communicates with a vent 24A of the inflator 24 is provided at a lower end and in the center in the vehicle width direction of a wall surface of the flow straightening cylinder 40 facing the front side (hereinafter referred to as "front surface 43"). A circular opening 42A is provided in the central portion (axially center portion) on the lower end surface 42 of the flow straightening cylinder 40, and the opening 42A faces the inner surface of the front wall 34A of the first lower chamber 34. That is, the gas ejected from the opening 42A is blown toward the inner surface of the front wall 34A of the first lower chamber 34.

Further, as shown in FIG. 2, a circular opening 44A is provided on a part of a wall surface of the flow straightening cylinder 40 facing the rear side (hereinafter referred to as "rear surface 44"), and the opening 44A faces the inner surface of a rear wall 36A of the second lower chamber 36. That is, the gas ejected from the opening 44A is blown toward the inner surface of the rear wall 36A of the second lower chamber 36.

Furthermore, a circular opening 46A is provided in the central portion (axially center portion) on an upper end surface 46 of the flow straightening cylinder 40, and the opening 46A faces the inner surface of a front wall 38A of the upper chamber 38 (first plane panel 26 described later). That is, the gas ejected from the opening 46A is blown toward the inner surface of the front wall 38A of the upper chamber 38.

Accordingly, a part of the outer surface (the surface opposite to the occupant restraint surface) of the front wall 38A of the upper chamber 38 contacts the inner surface of a front windshield glass 18 at a predetermined pressure, and is pressed relatively rearward by the front windshield glass 18 (reaction force is obtained from the front windshield glass 18).

In the first embodiment, as an example, the inner diameter of the opening 46A on the upper end surface 46 of the flow straightening cylinder 40 is larger than the inner diameter of the opening 44A on the rear surface 44 of the flow straightening cylinder 40, and the inner diameter of the opening 44A on the rear surface 44 of the flow straightening cylinder 40 is larger than the inner diameter of the opening 42A on the lower end surface 42 of the flow straightening cylinder 40.

However, the inner diameters of each of the openings 42A, 44A, 46A are not limited thereto, and it is only necessary that at least the inner diameter of the opening 46A on the upper end surface 46 is larger than the inner diameter of the opening 42A on the lower end surface 42 and the opening 44A on the rear surface 44. Therefore, for example, the inner diameter of the opening 42A on the lower end surface 42 and the inner diameter of the opening 44A on the rear surface 44 may be the same.

As shown in FIGS. 1 to 4, the upper partition member 37 is made of a fabric having a predetermined thickness, and is configured to partition the lower chamber 32 (second lower chamber 36) and the upper chamber 38 of the airbag main body 30 except for the flow straightening cylinder 40. That is, the outer peripheral edge portion of the upper partition member 37 is sewn onto the inner surface of the airbag main body 30 without gaps.

Figure 4:
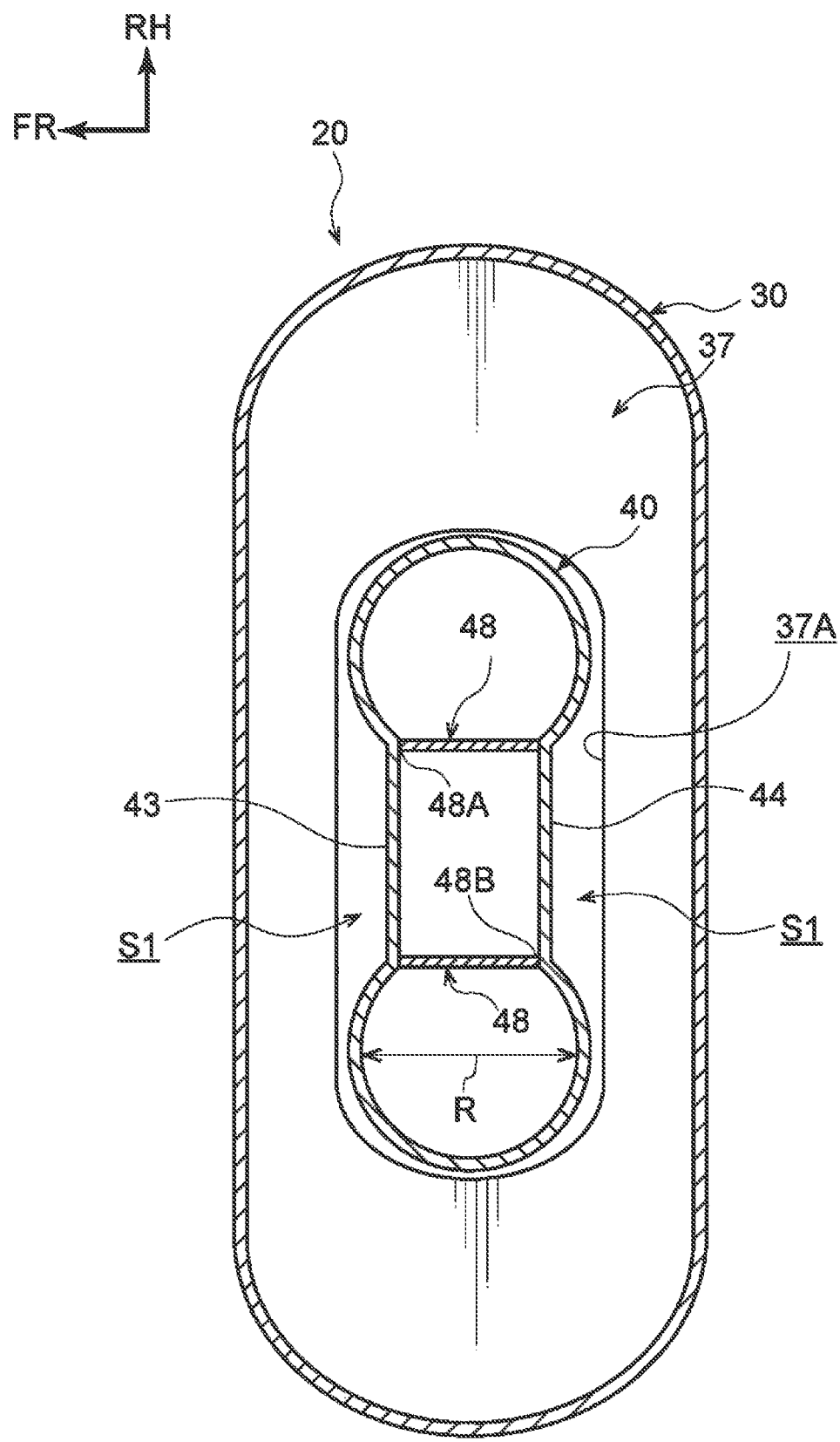
FIG. 4 is an enlarged sectional view taken along line X-X of FIG. 3.

In order to pass the flow straightening cylinder 40, the inner diameter (length in the front-rear direction and the right-left direction) of a substantially elliptical opening 37A in plan view provided in the central portion (axially center portion) of the upper partition member 37 is slightly larger than the outer diameter (length in the front-rear direction and the right-left direction) of the expanded and deployed flow straightening cylinder 40 (see FIG. 4).

Specifically, the flow straightening cylinder 40 is provided so as to be passed through the opening 37A of the upper partition member 37, and the peripheral edge portion of the opening 37A is not sewn onto the outer peripheral surface of the flow straightening cylinder 40. The flow straightening cylinder 40 is provided such that the sectional shape of the central portion in the vehicle width direction in at least the region passing through the opening 37A of the upper partition member 37 is a substantially rectangular flat shape with its longitudinal direction in the vehicle width direction in plan view, when the flow straightening cylinder 40 expands and deploys due to ejection of the gas. That is, the configuration of the flow straightening cylinder 40 is such that the thickness in the vehicle front-rear direction of the center portion in the vehicle width direction in at least the region passing through the opening 37A of the upper partition member 37 is regulated by a pair of right and left tethers 48.

As shown in FIGS. 2 and 3, each tether 48 extends in the vertical direction, and the lower end thereof faces the supply port 41. An upper end portion of each tether 48 extends to a predetermined position exceeding the upper partition member 37. Therefore, the gas ejected from the supply port 41 into the flow straightening cylinder 40 is sent to the upper chamber 38 through three flow paths divided into a right portion, a left portion, and a center portion by each tether 48.

Further, as shown in FIG. 4, the width of each tether 48 along the front-rear direction is shorter than the diameter R (length in the front-rear direction, that is, thickness) of the portion having a substantially circular section on both the right and left sides of each tether 48 of the flow straightening cylinder 40. A front end 48A of each tether 48 in at least the region that passes through the opening 37A of the upper partition member 37 is sewn onto a part of the front surface 43 of the flow straightening cylinder 40, and a rear end 48B of each tether 48 is sewn onto a part of the rear surface 44 of the flow straightening cylinder 40.

Accordingly, at least in the center in the vehicle width direction of the region that passes through the opening 37A of the upper partition member 37, a substantially rectangular flat shape in plan view is formed by each tether 48, the front surface 43, and the rear surface 44 of the flow straightening cylinder 40. Therefore, in the region that passes through the opening 37A of the upper partition member 37, a gap S1 is formed between the peripheral edge portion of the opening 37A and the outer peripheral surface (front surface 43 and rear surface 44) in the center portion in the vehicle width direction of the expanded and deployed flow straightening cylinder 40. In other words, the lower chamber 32 (the second lower chamber 36) and the upper chamber 38 communicate via the gap S1 in addition to the flow straightening cylinder 40.

The same applies to the lower partition member 35. That is, the lower partition member 35 is also made of fabric having a predetermined thickness, and is configured to partition the first lower chamber 34 and the second lower chamber 36 of the lower chamber 32 except for the flow straightening cylinder 40. In other words, the outer peripheral edge portion of the lower partition member 35 is sewn onto the inner surface of the airbag main body 30 without gaps.

Figure 7A:
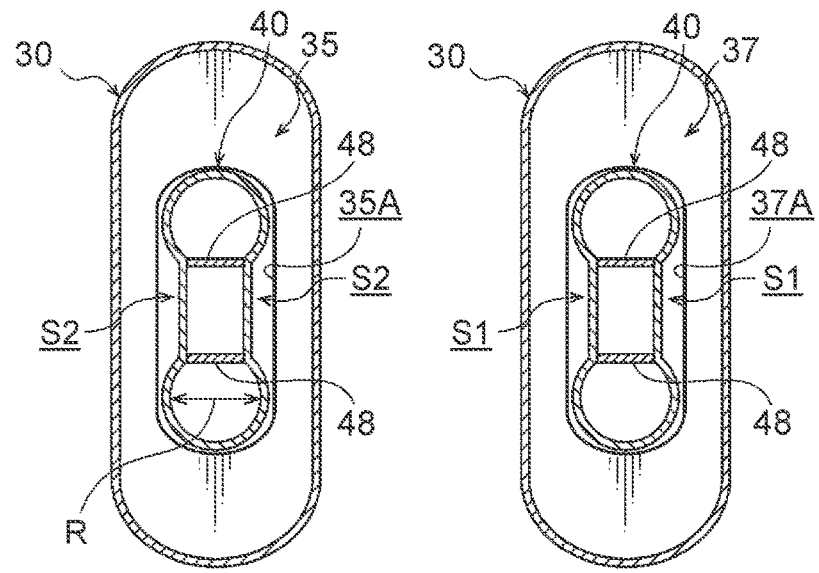
FIG. 7A is an enlarged sectional view corresponding to FIG. 4 and showing the shape of the flow straightening cylinder in a region that passes through an upper partition member and a lower partition member of the vehicle passenger seat airbag device according to the first embodiment.

In order to pass the flow straightening cylinder 40, the inner diameter (length in the front-rear direction and the right-left direction) of the substantially elliptical opening 35A in plan view provided in the central portion (axially center portion) of the lower partition member 35 is slightly larger than the outer diameter (length in the front-rear direction and the right-left direction) of the expanded and deployed flow straightening cylinder 40 (see FIG. 7A).

Specifically, the flow straightening cylinder 40 is provided so as to also be passed through the opening 35A of the lower partition member 35, and the peripheral edge portion of the opening 35A is not sewn onto the outer peripheral surface of the flow straightening cylinder 40. The flow straightening cylinder 40 is provided such that the sectional shape of the central portion in the vehicle width direction in at least the region passing through the opening 35A of the lower partition member 35 is a substantially rectangular flat shape with its longitudinal direction in the vehicle width direction in plan view, when the flow straightening cylinder 40 expands and deploys due to ejection of the gas. That is, the configuration of the flow straightening cylinder 40 is such that the thickness in the vehicle front-rear direction of the center portion in the vehicle width direction in at least the region passing through the opening 35A of the lower partition member 35 is regulated by a pair of right and left tethers 48.

As described above, the width along the front-rear direction of each tether 48 is shorter than the diameter R (length in the front-rear direction, that is, thickness (see FIG. 7A)) of the portion having a substantially circular section on both the right and left sides of each tether 48 of the flow straightening cylinder 40. The front end 48A of each tether 48 in at least the region that passes through the opening 35A of the lower partition member 35 is sewn onto a part of the front surface 43 of the flow straightening cylinder 40, and the rear end 48B of each tether 48 is sewn onto a part of the rear surface 44 of the flow straightening cylinder 40 (see FIG. 4).

Accordingly, at least in the center in the vehicle width direction of the region that passes through the opening 35A of the lower partition member 35, a substantially rectangular flat shape in plan view is formed by each tether 48, the front surface 43, and the rear surface 44 of the flow straightening cylinder 40. Therefore, in the region that passes through the opening 35A of the lower partition member 35, a gap S2 (see FIG. 7A) is formed between the peripheral edge portion of the opening 35A and the outer peripheral surface (front surface 43 and rear surface 44) of the expanded and deployed flow straightening cylinder 40. That is, the first lower chamber 34 and the second lower chamber 36 also communicate via the gap S2 in addition to the flow straightening cylinder 40.

Figure 5B:
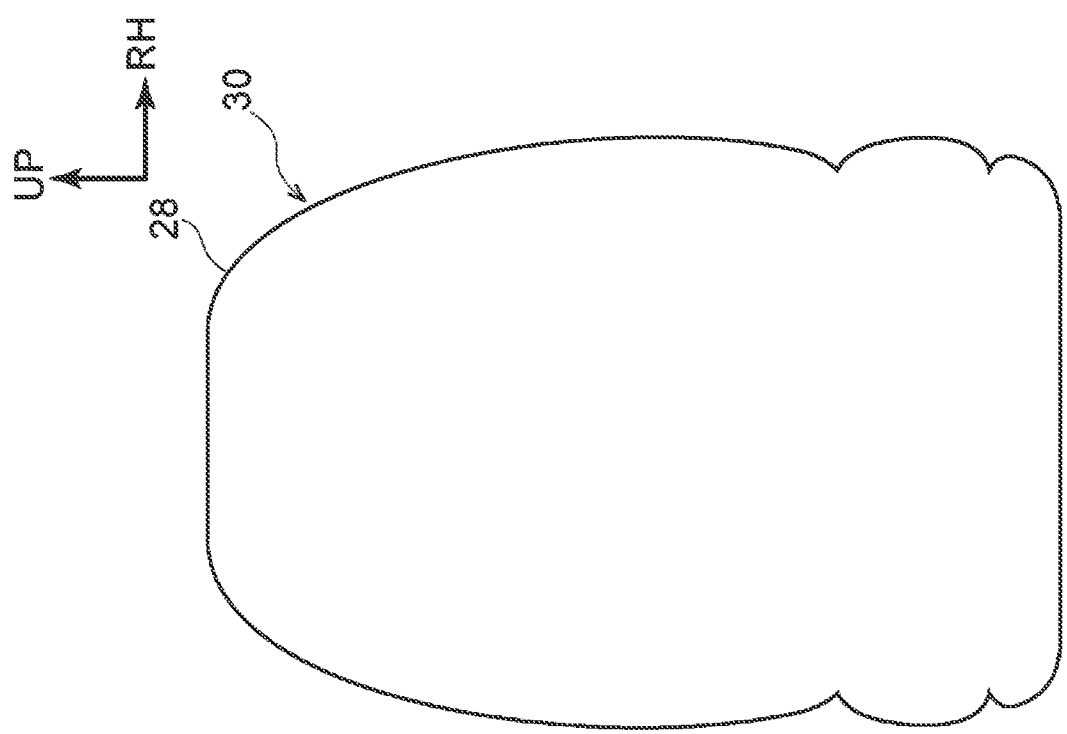
FIG. 5B is a front view showing a second plane panel constituting the airbag main body of the vehicle passenger seat airbag device according to the first embodiment.
Figure 5A:
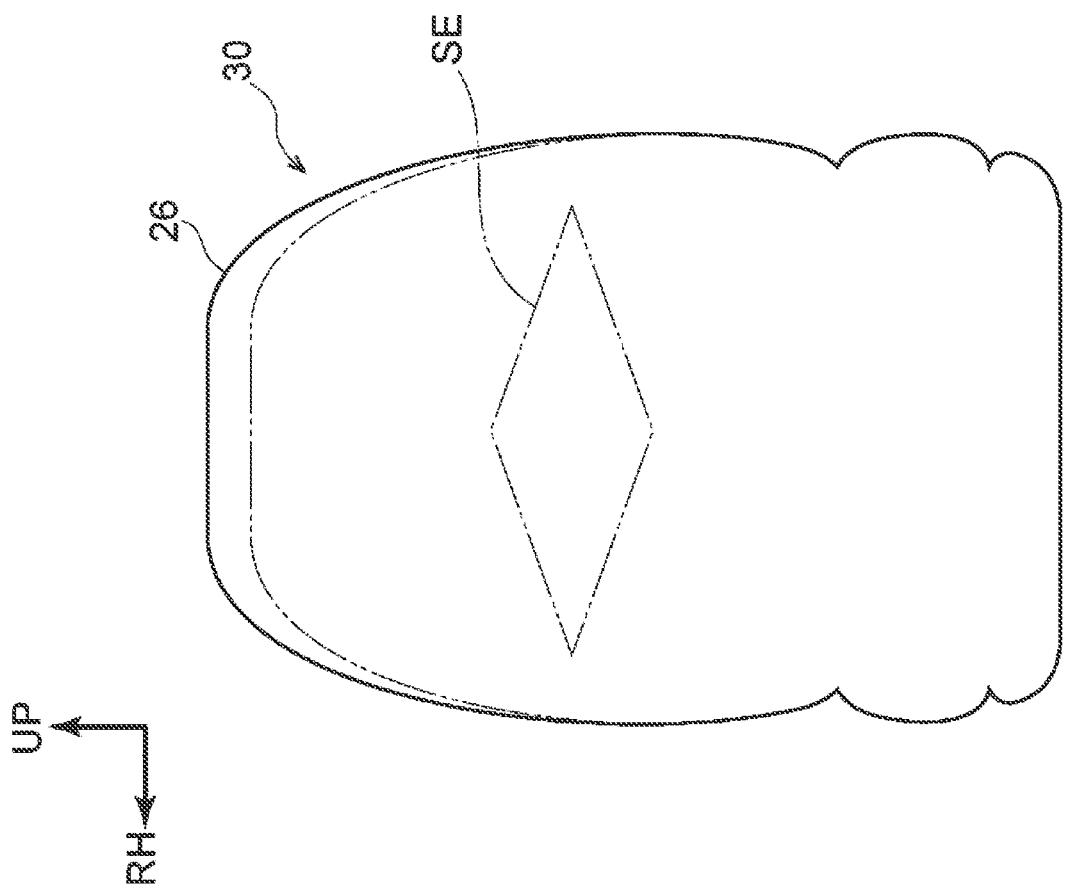
FIG. 5A is a front view showing a first plane panel constituting the airbag main body of the vehicle passenger seat airbag device according to the first embodiment.

As shown in FIGS. 5A and 5B, the airbag main body 30 is composed of the first plane panel 26 disposed on the instrument panel 14 side and a second plane panel 28 disposed on the occupant P1 side. The first plane panel 26 and the second plane panel 28 have the same size and shape, and their outer peripheral edge portions are sewn onto each other (by plane sewing in which two base fabrics are sewn together), whereby the airbag main body 30 is manufactured.

The circumference along the vertical direction of the first plane panel 26 is set shorter than the circumference along the vertical direction of the second plane panel 28 (in FIG. 5A, the circumference that is set short is shown by a virtual line). Specifically, the first plane panel 26 is tuck (pinch) sewn, so that its circumference along the vertical direction is set (formed) to be short.

That is, as shown in FIG. 5A, in a substantially center portion in the vertical direction of the first plane panel 26, a diamond-shaped sewing region SE in which the diagonal line in the right-left direction is the long side is set in front view seen in the front-rear direction of the vehicle 10. By pinching the fabric in the vertical direction and sewing the sewing region SE, the circumference along the vertical direction of the first plane panel 26 is made shorter than the circumference along the vertical direction of the second plane panel 28.

As shown in FIGS. 6A and 6B, a tuck portion 26A, which is a portion in which the sewing region SE is pinched and sewn, is not formed on the surface side that comes into contact with the occupant P1 seated in the passenger seat 12 (occupant restraint surface side), so that the tuck portion 26A may protrude forward from the first plane panel 26 as shown in FIG. 6A. Further, as shown in FIG. 6B, the tuck portion 26A may be folded into the airbag main body 30 (upper chamber 38) so as not to protrude forward from the first plane panel 26.

Next, the operation of the airbag device 20 according to the first embodiment having the above configuration will be described.

When the detection device detects a frontal collision of the vehicle 10, the inflator 24 is activated, and gas is instantaneously ejected (supplied) to the inside of the airbag main body 30 through the inside of the flow straightening cylinder 40. Specifically, as shown in FIG. 2, the gas ejected from the inflator 24 is first ejected (supplied) into the flow straightening cylinder 40.

Then, the gas ejected (supplied) into the flow straightening cylinder 40 is ejected from the opening 42A provided in the central portion on the lower end surface 42 of the flow straightening cylinder 40, and is supplied to the first lower chamber 34 of the lower chamber 32. The gas is also ejected from the opening 44A provided on the rear surface 44 of the flow straightening cylinder 40, and is supplied to the second lower chamber 36 of the lower chamber 32.

Further, the gas ejected (supplied) into the flow straightening cylinder 40 is ejected from the opening 46A provided in the central portion on the upper end surface 46 of the flow straightening cylinder 40, and is supplied to the upper chamber 38. In other words, the gas ejected into the flow straightening cylinder 40 is distributed by the flow straightening cylinder 40 into the lower chamber 32 (the first lower chamber 34 and the second lower chamber 36) and the upper chamber 38.

Therefore, compared with the configuration in which the flow straightening cylinder 40 is not provided (the ejected gas is not distributed to the upper chamber 38), the lower chamber 32 is suppressed from being broken by the high pressure of the instantaneously ejected gas, and the internal pressure of the upper chamber 38 can be easily adjusted to be lower than the internal pressure of the lower chamber 32.

In other words, it is necessary to set the internal pressure of the upper chamber 38 lower than the internal pressure of the lower chamber 32 in the airbag main body 30, and the gas ejected into the flow straightening cylinder 40 is distributed by the flow straightening cylinder 40 to the lower chamber 32 (the first lower chamber 34 and the second lower chamber 36) and the upper chamber 38, so that the setting can be easily realized.

Further, in the flow straightening cylinder 40 according to the first embodiment, the inner diameter of the opening 46A provided on the upper end surface 46 is larger than the inner diameter of the opening 42A provided on the lower end surface 42 and the inner diameter of the opening 44A provided on the rear surface 44 and through which gas is ejected into the second lower chamber 36.

Therefore, the amount of gas ejected into the upper chamber 38 and the amount of gas ejected into the lower chamber 32 (first lower chamber 34 and second lower chamber 36) can be appropriately controlled, and the lower chamber 32 (first lower chamber 34 and second lower chamber 36) can be further suppressed from being broken due to the high pressure of the instantaneously ejected gas.

The opening 44A is provided on the rear surface 44 of the flow straightening cylinder 40 according to the first embodiment. Therefore, compared with the case of a flow straightening cylinder (not shown) in which only the opening 42A on the lower end surface 42 and the opening 46A on the upper end surface 46 are provided, it is possible to suppress the deployment behavior of the flow straightening cylinder 40 (particularly the portion disposed inside the upper chamber 38) from becoming unstable when the gas is instantaneously ejected (supplied) to expand and deploy the flow straightening cylinder 40.

Therefore, the expanded and deployed flow straightening cylinder 40 is quickly disposed in a curved shape along the outer shape of the rear surface 14A of the instrument panel 14 in side view, and the gas ejected from the opening 42A of the flow straightening cylinder 40 is blown to the inner surface of the front wall 34A of the first lower chamber 34. Then, the gas ejected from the opening 44A of the flow straightening cylinder 40 is blown to the inner surface of the rear wall 36A of the second lower chamber 36, and the gas ejected from the opening 46A of the flow straightening cylinder 40 is blown to the inner surface of the front wall 38A of the upper chamber 38.

Accordingly, the entire airbag main body 30 expands and deploys so as to be pushed forward, and the instrument panel 14 side of the expanded and deployed airbag main body 30 is disposed along the outer shape of the rear surface 14A of the instrument panel 14. In particular, a part of the outer surface of the front wall 38A of the upper chamber 38 contacts the inner surface of the front windshield glass 18 at a predetermined pressure, and is pressed relatively rearward by the front windshield glass 18 (a reaction force is obtained from the front windshield glass 18).

Therefore, for example, even if the airbag main body 30 for the passenger seat 12 having the lower chamber 32 and the upper chamber 38 becomes larger due to the thinner size of the instrument panel 14, it is possible to suppress the deployment behavior of the airbag main body 30 from becoming unstable (the deployment behavior can be stabilized) when the gas is instantaneously supplied to expand and deploy the airbag main body 30. Thus, the lower limb and the upper body (including the head) of the occupant P1 seated in the passenger seat 12 can be appropriately restrained.

Further, when the flow straightening cylinder 40 expands and deploys, the sectional shape of the central portion in the vehicle width direction in at least the region that passes through the upper partition member 37 is formed in a substantially rectangular flat shape with its longitudinal direction in the vehicle width direction. Here, for example, in the child occupant P1 corresponding to the human body dummy of a three-year-old child, the chest faces a position corresponding to the upper partition member 37.

Since the sectional shape of the center portion in the vehicle width direction in at least the region that passes through the upper partition member 37 of the flow straightening cylinder 40 is formed in a substantially rectangular flat shape with its longitudinal direction in the vehicle width direction, and the thickness in the front-rear direction is reduced, the amount of contact of the child occupant P1 through the airbag main body 30 with the flow straightening cylinder 40 having a high internal pressure (the amount of interference overlapping in the front-rear direction in side view (see FIG. 2)) can be reduced. This makes it possible to suppress a load more than necessary from being applied to the child occupant P1, and the injury value for the chest and neck of the child occupant P1 can be reduced.

Furthermore, the sectional shape of the center portion in the vehicle width direction in at least the region passing through the lower partition member 35 of the flow straightening cylinder 40 is also formed in a substantially rectangular flat shape with its longitudinal direction in the vehicle width direction, and the thickness in the front-rear direction is reduced. Therefore, even in the case of a smaller child occupant (not shown) whose chest faces a position corresponding to the lower partition member 35, the amount of contact through the airbag main body 30 with the flow straightening cylinder 40 having a high internal pressure (the amount of interference overlapping in the front-rear direction in side view) can be reduced. This makes it possible to suppress a load more than necessary from being applied to the child occupant, and the injury value for the chest and neck of the child occupant can be reduced.

The flow straightening cylinder 40 is formed in a substantially rectangular flat shape by the pair of right and left tethers 48 that regulates the thickness in the front-rear direction. Therefore, the flow straightening cylinder 40 can be more easily formed in a substantially rectangular flat shape as compared with the case where the substantially rectangular flat shape is formed by a method other than the pair of right and left tethers 48.

Further, in order to pass the flow straightening cylinder 40, the inner diameter of the opening 37A provided in the upper partition member 37 and the inner diameter of the opening 35A provided in the lower partition member 35 are each slightly larger than the outer diameter of the expanded and deployed flow straightening cylinder 40. That is, a gap (including gap S1 and gap S2) is formed between the peripheral edge portion of the opening 37A of the upper partition member 37 and the peripheral edge portion of the opening 35A of the lower partition member 35 and the outer peripheral surface of the expanded and deployed flow straightening cylinder 40.

Therefore, the gas in the first lower chamber 34 can flow to the second lower chamber 36 through the gap (including the gap S2) between the peripheral edge portion of the opening 35A of the lower partition member 35 and the outer peripheral surface of the flow straightening cylinder 40, and the gas in the second lower chamber 36 can flow to the upper chamber 38 through the gap (including the gap S1) between the peripheral edge portion of the opening 37A of the upper partition member 37 and the outer peripheral surface of the flow straightening cylinder 40. Accordingly, adjustment (degassing) of the pressure in the lower chamber 32 after the gas is supplied can also be easily performed.

The airbag main body 30 includes the first plane panel 26 disposed on the instrument panel 14 side and the second plane panel 28 disposed on the occupant P1 side. That is, the airbag main body 30 is manufactured by inexpensive plane sewing (sewing two sheets of base fabric together). Therefore, the manufacturing cost and weight of the airbag main body 30 can be reduced as compared to the airbag main body (not shown) in which the upper chamber and the lower chamber are integrated by three-dimensional sewing.

The circumference along the vertical direction of the first plane panel 26 is set shorter than the circumference along the vertical direction of the second plane panel 28. Therefore, as compared to the case where the circumference along the vertical direction of the first plane panel 26 and the circumference along the vertical direction of the second plane panel 28 are set to the same length, the instrument panel 14 side of the expanded and deployed airbag main body 30 is more reliably disposed along the outer shape of the rear surface 14A of the instrument panel 14.

In other words, when the circumference along the vertical direction of the first plane panel 26 and the circumference along the vertical direction of the second plane panel 28 are set to the same length, the upper chamber 38 of the expanded and deployed airbag main body 30 becomes tilted rearwards. On the other hand, when the circumference along the vertical direction of the first plane panel 26 is set shorter than the circumference along the vertical direction of the second plane panel 28, the upper chamber 38 of the expanded and deployed airbag main body 30 becomes tilted forwards (the rearward tilt is suppressed).

Accordingly, the part of the outer surface of the front wall 38A of the upper chamber 38 more reliably contacts the inner surface of the front windshield glass 18 at a predetermined pressure, and is pressed relatively rearward by the front windshield glass 18. This makes it possible to further suppress the deployment behavior of the airbag main body 30 from becoming unstable (the deployment behavior can be further stabilized) when gas is instantaneously supplied to expand and deploy the airbag main body 30, and thus the lower limb and the upper body (including the head) of the occupant P1 seated in the passenger seat 12 can be appropriately restrained.

Moreover, the first plane panel 26 is tuck sewn, so that its circumference along the vertical direction is set (formed) to be short. Therefore, the manufacturing cost of the airbag main body 30 can be further reduced as compared to the case where a first plane panel (not shown) having a circumference along the vertical direction that is set (formed) short is prepared in advance.

In the first embodiment, as shown in FIG. 7A, at least in the region that passes through the upper partition member 37 and the lower partition member 35, the center portion in the vehicle width direction of the flow straightening cylinder 40 is formed in a substantially rectangular flat shape in plan view, but the shape of the flow straightening cylinder 40 is not limited to the substantially rectangular flat shape.

Figure 7B:
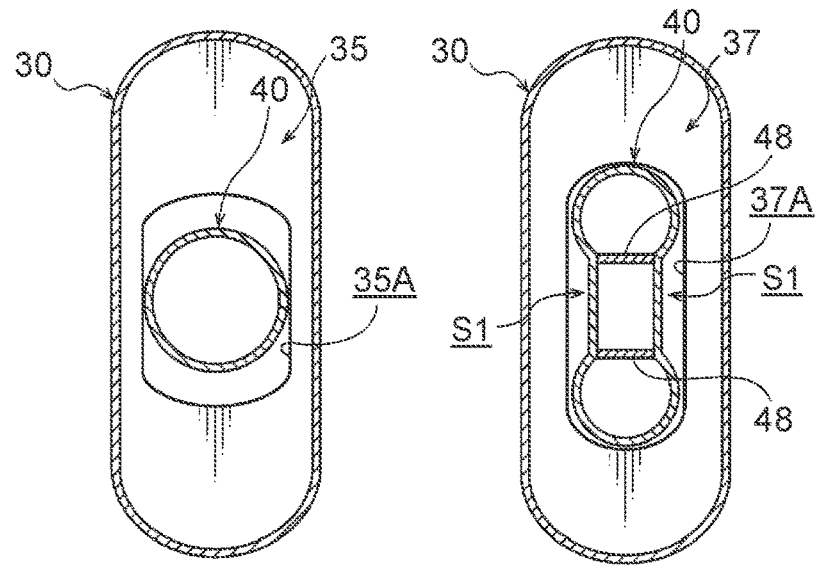
FIG. 7B is an enlarged sectional view corresponding to FIG. 4 and showing a first modification of the shape of the flow straightening cylinder in the region that passes through the upper partition member and the lower partition member of the vehicle passenger seat airbag device according to the first embodiment.

As shown in FIG. 7B, for example, the flow straightening cylinder 40 may be formed in a substantially rectangular flat shape only in the region that passes through the upper partition member 37, and the region that passes through the lower partition member 35 may be formed in a circular shape or an elliptical shape. In this case, the shape of the opening 35A of the lower partition member 35 may be appropriately set according to the circular shape or the elliptical shape.

Figure 7C:
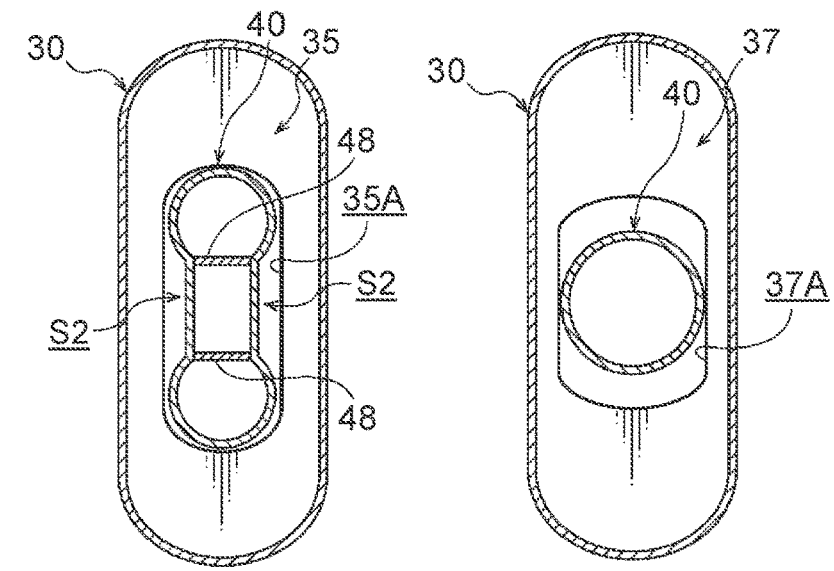
FIG. 7C is an enlarged sectional view corresponding to FIG. 4 and showing a second modification of the shape of the flow straightening cylinder in the region that passes through the upper partition member and the lower partition member of the vehicle passenger seat airbag device according to the first embodiment.

Further, as shown in FIG. 7C, for example, the flow straightening cylinder 40 may be formed in a substantially rectangular flat shape only in the region that passes through the lower partition member 35, and the region passing through the upper partition member 37 may be formed in a circular shape or an elliptical shape. In this case, the shape of the opening 37A of the upper partition member 37 may be appropriately set according to the circular shape or the elliptical shape.

Figure 8:
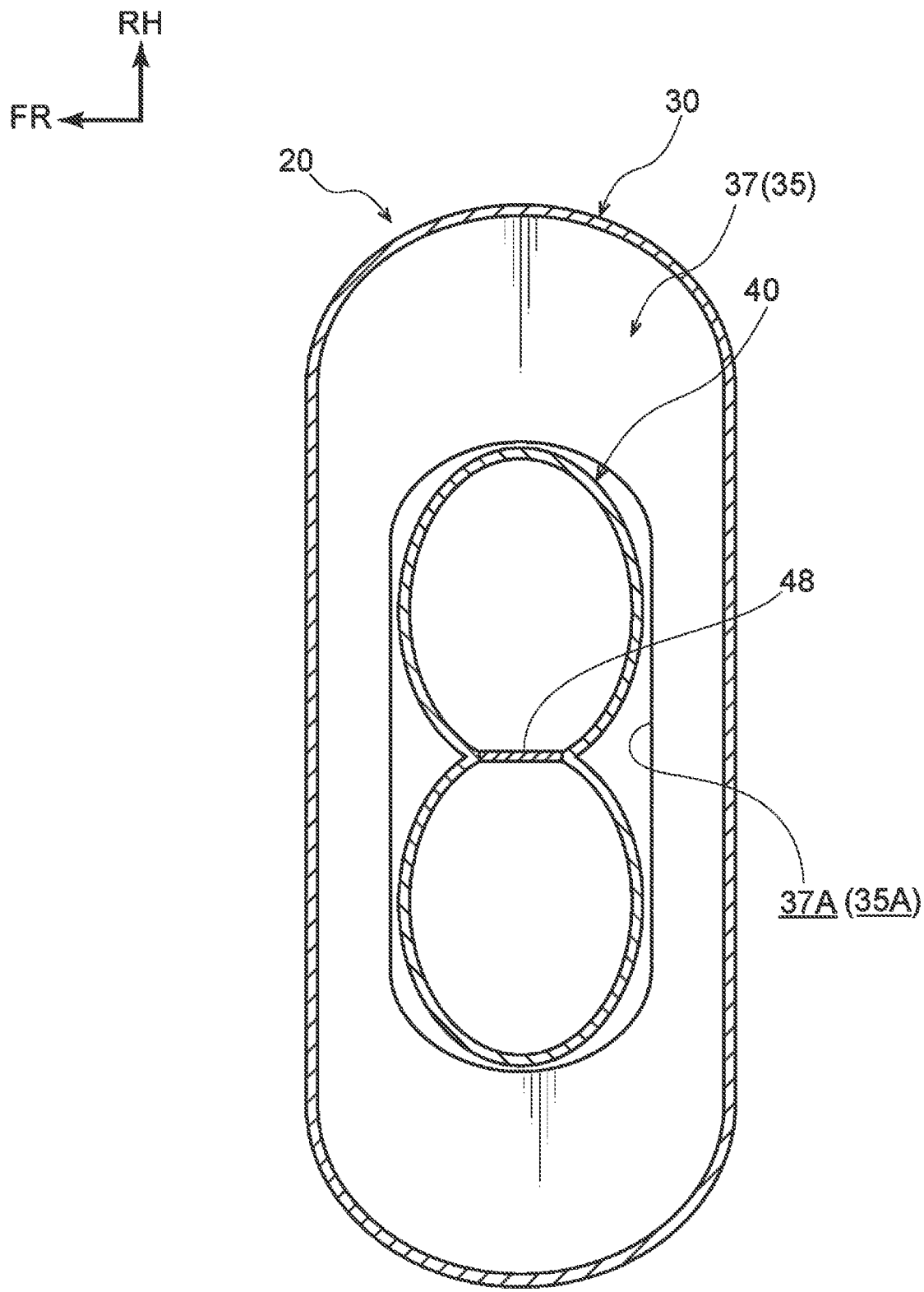
FIG. 8 is an enlarged sectional view corresponding to FIG. 4 and showing a modification of the tether provided in the flow straightening cylinder of the vehicle passenger seat airbag device according to the first embodiment.

Further, as shown in FIG. 8, the configuration may be such that only one tether 48 is provided in the center portion in the vehicle width direction in at least the region that passes through the upper partition member 37 and the lower partition member 35 of the flow straightening cylinder 40. In other words, the gas ejected from the supply port 41 into the flow straightening cylinder 40 may be sent to the upper chamber 38 through two flow paths divided into a right portion and a left portion by the tether 48.

Second Embodiment

Next, a second embodiment will be described. The same parts as those in the first embodiment are designated by the same reference signs, and detailed description thereof will be omitted as appropriate.

Figure 9:
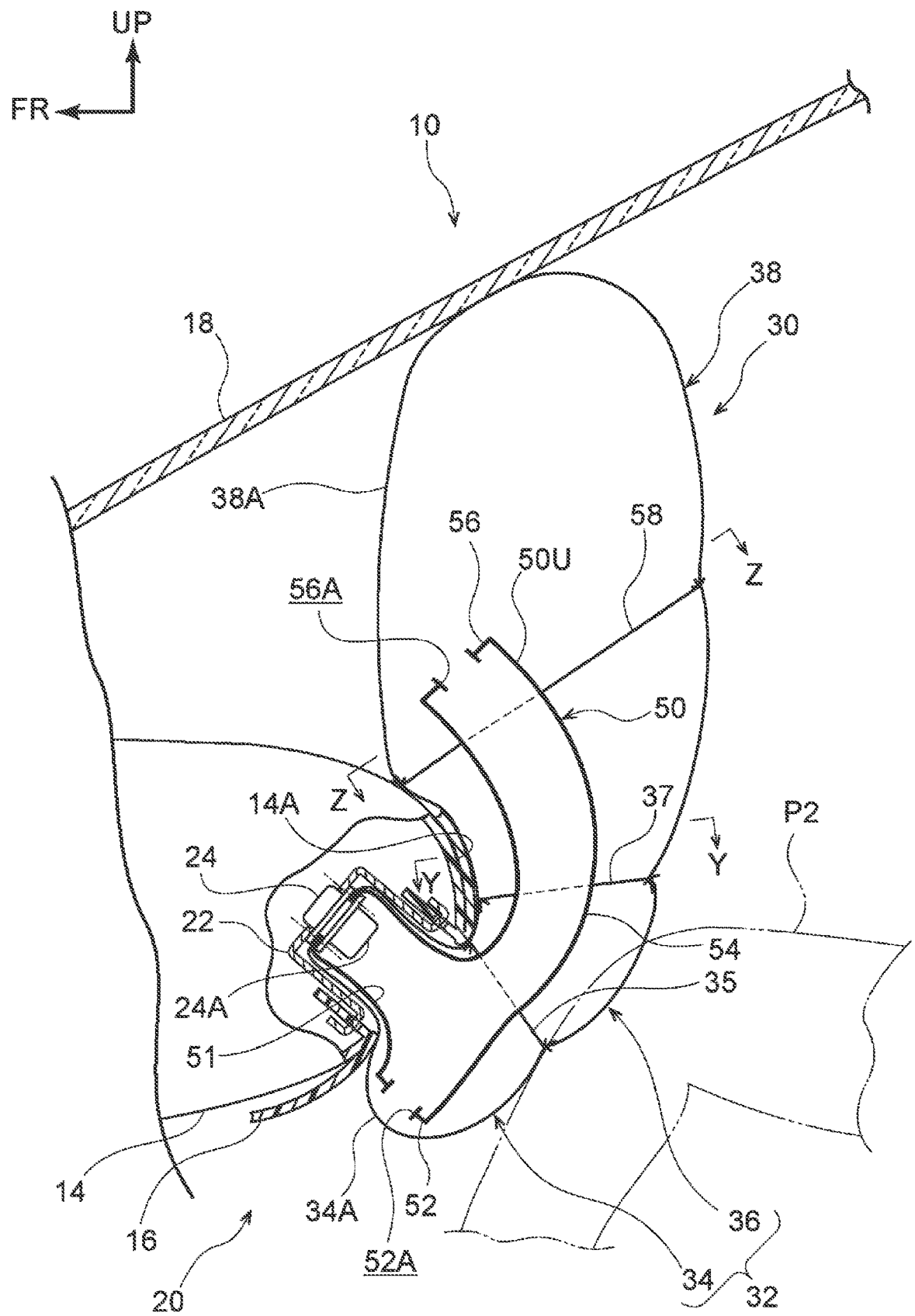
FIG. 9 is a schematic side view shown by enlarging the vehicle passenger seat airbag device according to a second embodiment.
Figure 10:
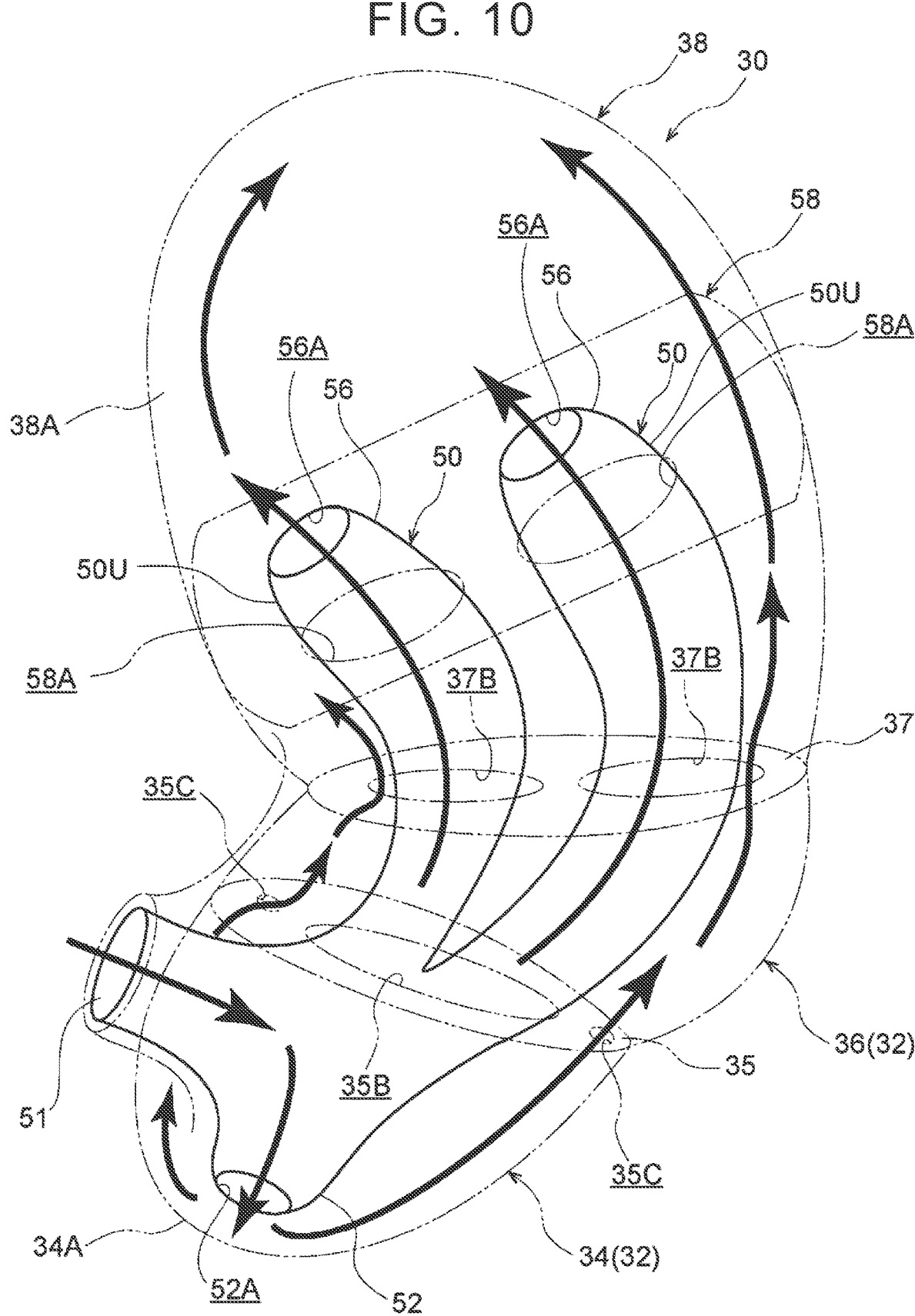
FIG. 10 is a schematic perspective view showing the airbag main body of the vehicle passenger seat airbag device according to the second embodiment.

As shown in FIGS. 9 and 10, the airbag device 20 according to the second embodiment differs from the airbag device 20 according to the first embodiment only in that, the airbag device 20 according to the second embodiment is provided with a flow straightening cylinder 50 that forms a substantially "Y" shape in front view and forms a curved shape along the outer shape of the rear surface 14A of the instrument panel 14 in side view when expanded and deployed due to the ejection of gas, the airbag device 20 according to the second embodiment is provided with an upper partition member 37 and a lower partition member 35 through which the flow straightening cylinder 50 that forms a substantially "Y" shape in front view can be passed, and the airbag device 20 according to the second embodiment is provided with a holding member 58 through which the upper end portion of the flow straightening cylinder 50 is passed.

Figure 11:
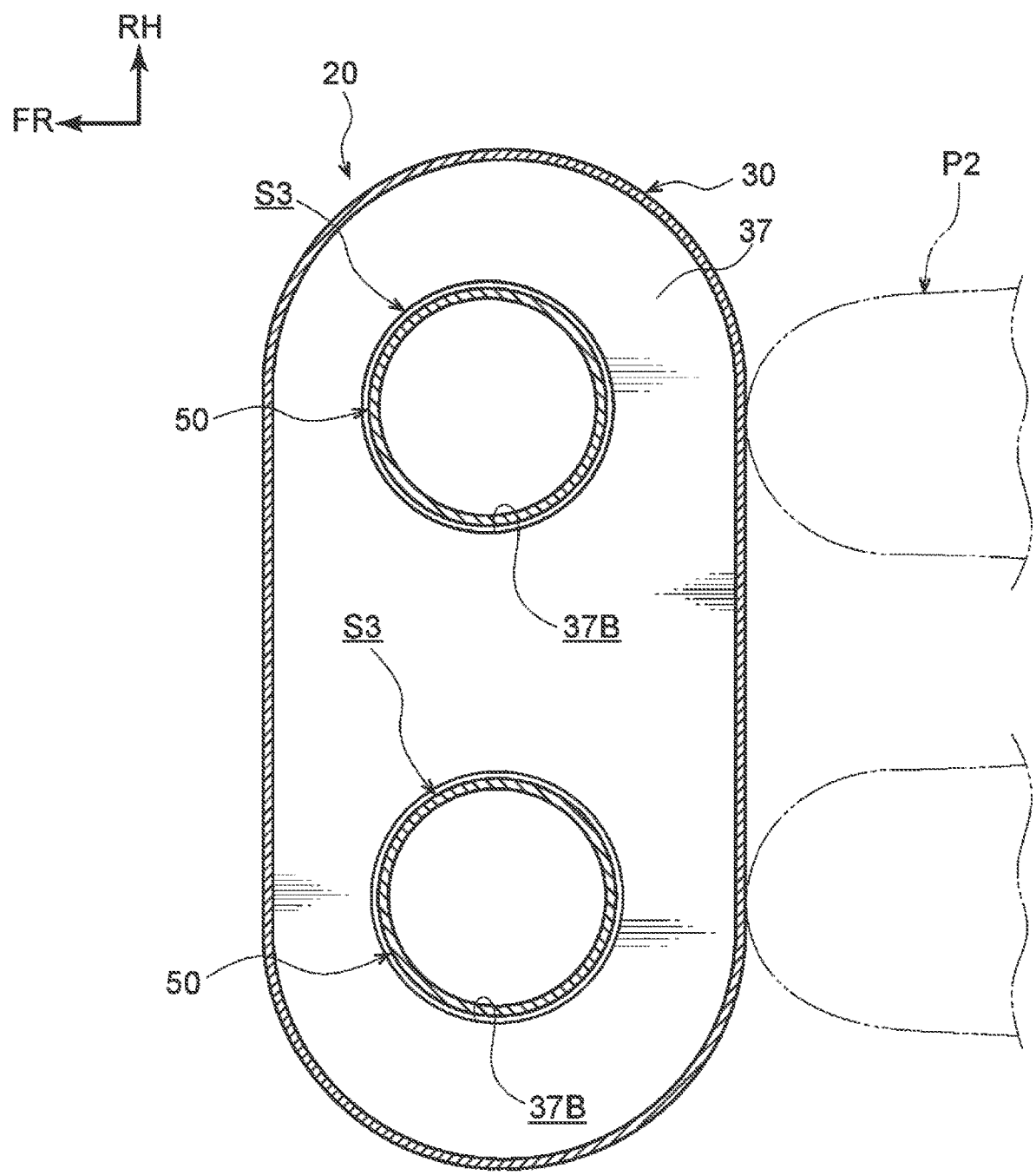
FIG. 11 is an enlarged sectional view taken along line Y-Y of FIG. 9.

Specifically, the flow straightening cylinder 50 is provided so as to be passed through a pair of right and left circular openings 37B provided in the upper partition member 37 at a distance from each other in the vehicle width direction, and is provided to be passed through a single circular opening 35B provided in the central portion (axially center portion) of the lower partition member 35. That is, the flow straightening cylinder 50 is branched into two in the second lower chamber 36, and as shown in FIG. 11, the portion (upper part) branched into two is disposed at a position facing both knees of the adult occupant P2 corresponding to the human body dummy AM50.

A circular opening 52A serving as a gas vent is provided at the central portion (axially center portion) on the lower end surface 52 of a single portion (lower portion) that is not branched into two in the flow straightening cylinder 50, and the opening 52A faces the inner surface of the front wall 34A of the first lower chamber 34. That is, of the gas ejected from the vent 24A of the inflator 24 into the flow straightening cylinder 50 via the supply port 51, the gas ejected from the opening 52A is blown toward the inner surface of the front wall 34A of the first lower chamber 34.

In addition, a circular opening 56A serving as a gas vent is provided in the central portion (axially center portion) on each upper end surface 56 of the upper portion branched into two in the flow straightening cylinder 50, and each opening 56A faces the inner surface of the front wall 38A (first plane panel 26) of the upper chamber 38. That is, of the gas ejected from the vent 24A of the inflator 24 into the flow straightening cylinder 50 via the supply port 51, the gas ejected from each opening 56A is blown toward the inner surface of the front wall 38A of the upper chamber 38.

Accordingly, a part of the outer surface (the surface opposite to the occupant restraint surface) of the front wall 38A of the upper chamber 38 contacts the inner surface of a front windshield glass 18 at a predetermined pressure, and is pressed relatively rearward by the front windshield glass 18 (reaction force is obtained from the front windshield glass 18).

An opening is not provided on a rear surface 54 of the flow straightening cylinder 50. Instead, a circular opening 35C is provided on both the right and left sides of the opening 35B of the lower partition member 35, and the gas ejected into the first lower chamber 34 is supplied to the second lower chamber 36 through the pair of right and left openings 35C.

The inner diameter of the opening 35C is set smaller than the inner diameter of the opening 35B. The gas supplied into the second lower chamber 36 flows to the upper chamber 38 through gaps S3 (see FIG. 11) between the peripheral edge portions of the openings 37B of the upper partition member 37 and the outer peripheral surfaces of the upper portion branched into two of the flow straightening cylinder 50.

Figure 12:
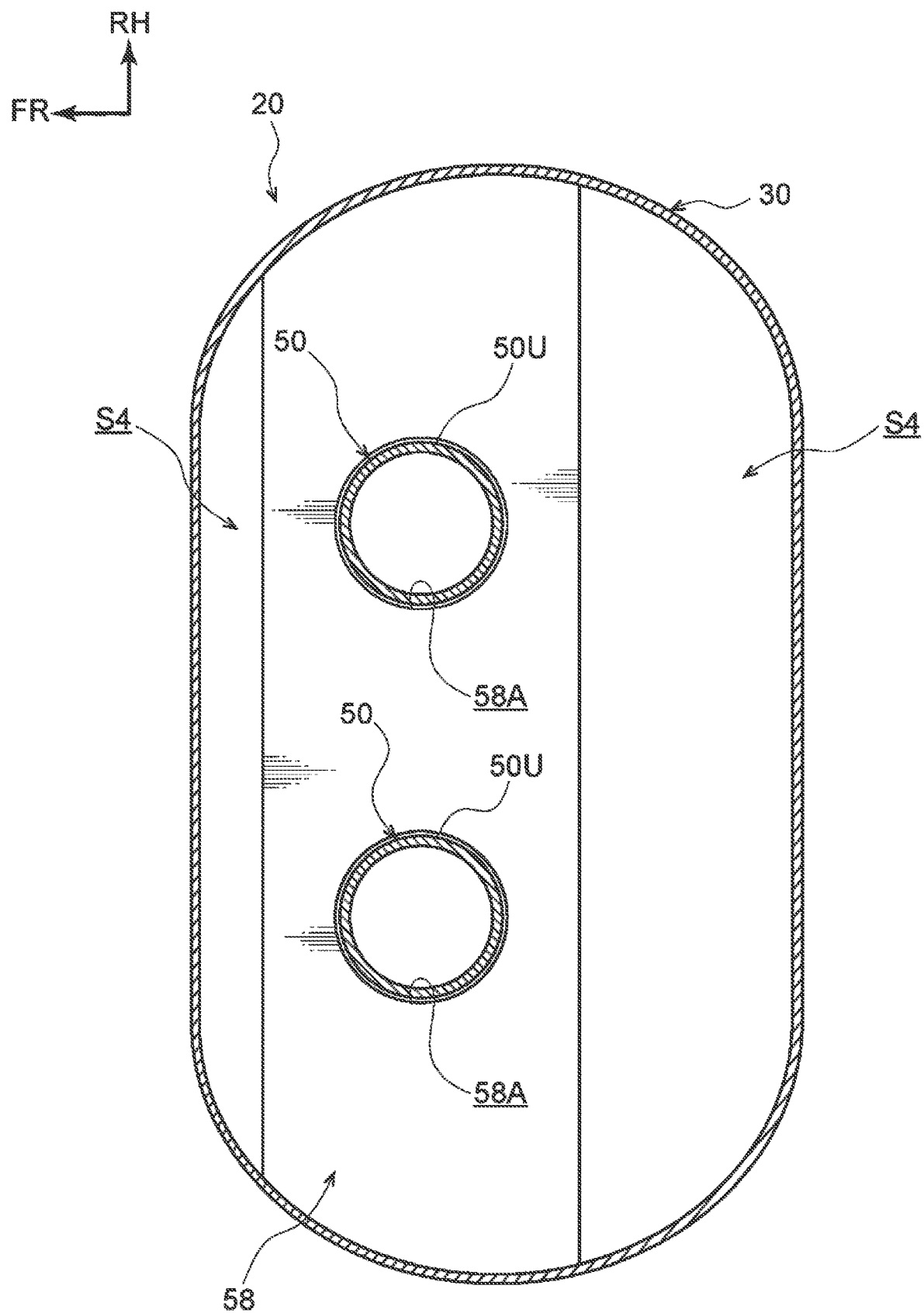
FIG. 12 is an enlarged sectional view taken along line Z-Z of FIG. 9.

Further, as shown in FIGS. 10 and 12, the holding member 58 is provided inside the upper chamber 38. The holding member 58 has through holes 58A through which upper end portions 50U of the flow straightening cylinder 50 are each inserted. The holding member 58 is made of a fabric having a predetermined thickness, and only both ends in the vehicle width direction are sewn onto the airbag main body 30. That is, a gap S4 is formed on the front side and the rear side of the holding member 58, and even when the holding member 58 is provided, gas flows from the lower part to the upper part of the upper chamber 38 through the gap S4.

Further, as shown in FIGS. 13A and 13B, the flow straightening cylinder 50 is configured by superimposing two base fabrics formed in a substantial "Y" shape in front view and sewing the perimeter except for the opening 52A and the openings 56A that are gas vents. That is, the flow straightening cylinder 50 is composed of a first plane panel 50A disposed on the instrument panel 14 side and a second plane panel 50B disposed on the occupant P2 side. The first plane panel 50A and the second plane panel 50B have the same size and shape, and their outer peripheral edge portions are sewn onto each other (by plane sewing in which two base fabrics are sewn together), whereby the flow straightening cylinder 50 is manufactured.

Next, the operation of the airbag device 20 according to the second embodiment having the above configuration will be described. For the same operation as in the first embodiment, description thereof will be omitted as appropriate.

When the detection device detects a frontal collision of the vehicle 10, the inflator 24 is activated, and gas is instantaneously ejected (supplied) to the inside of the airbag main body 30 through the inside of the flow straightening cylinder 50. Specifically, as shown in FIG. 10, the gas ejected from the inflator 24 is first ejected (supplied) into the flow straightening cylinder 50.

Then, the gas ejected (supplied) into the flow straightening cylinder 50 is ejected from the opening 52A provided in the central portion on the lower end surface 52 of the flow straightening cylinder 50 and is supplied to the first lower chamber 34 of the lower chamber 32. Further, the gas supplied to the first lower chamber 34 is supplied to the second lower chamber 36 of the lower chamber 32 through the openings 35C provided in the lower partition member 35.

Furthermore, the gas ejected (supplied) into the flow straightening cylinder 50 is ejected from the openings 56A provided in the central portion on each upper end surface 56 branched into two of the flow straightening cylinder 50 and is supplied to the upper chamber 38. That is, the gas ejected into the flow straightening cylinder 50 is distributed by the flow straightening cylinder 50 into the lower chamber 32 (the first lower chamber 34 and the second lower chamber 36) and the upper chamber 38.

Therefore, compared with the configuration in which the flow straightening cylinder 50 is not provided (the ejected gas is not distributed to the upper chamber 38), the lower chamber 32 is suppressed from being broken by the high pressure of the instantaneously ejected gas, and the internal pressure of the upper chamber 38 can be easily adjusted to be lower than the internal pressure of the lower chamber 32.

Further, the gas ejected into the first lower chamber 34 is supplied to the second lower chamber 36 through the openings 35C provided in the lower partition member 35, and the gas supplied into the second lower chamber 36 flows to the upper chamber 38 through the gaps between the peripheral edge portions of the openings 37B of the upper partition member 37 and the outer peripheral surfaces of the upper portion branched into two of the flow straightening cylinder 50. In other words, gas passages are provided between the lower chamber 32 and the upper chamber 38 other than the flow straightening cylinder 50.

Therefore, the amount of gas ejected into the upper chamber 38 and the amount of gas ejected into the lower chamber 32 (first lower chamber 34 and second lower chamber 36) can be appropriately controlled, and the lower chamber 32 (first lower chamber 34 and second lower chamber 36) can be further suppressed from being broken due to the high pressure of the instantaneously ejected gas.

Further, as described above, the gas ejected from the opening 52A of the flow straightening cylinder 50 is blown to the inner surface of the front wall 34A of the first lower chamber 34, and the gas ejected from the openings 56A of the flow straightening cylinder 50 is blown to the inner surface of the front wall 38A of the upper chamber 38. Accordingly, the entire airbag main body 30 expands and deploys so as to be pushed forward, and the instrument panel 14 side of the expanded and deployed airbag main body 30 is disposed along the outer shape of the rear surface 14A of the instrument panel 14.

In particular, a part of the outer surface of the front wall 38A of the upper chamber 38 contacts the inner surface of the front windshield glass 18 at a predetermined pressure, and is pressed relatively rearward by the front windshield glass 18 (a reaction force is obtained from the front windshield glass 18).

Therefore, for example, even if the airbag main body 30 for the passenger seat 12 having the lower chamber 32 and the upper chamber 38 becomes larger due to the thinner size of the instrument panel 14, it is possible to suppress the deployment behavior of the airbag main body 30 from becoming unstable (the deployment behavior can be stabilized) when the gas is instantaneously supplied to expand and deploy the airbag main body 30. Thus, the lower limb and the upper body (including the head) of the occupant P2 seated in the passenger seat 12 can be appropriately restrained.

Further, the flow straightening cylinder 50 is formed in a substantial "Y" shape in front view so that the upper portion branched in the vehicle width direction is disposed at a position facing both knees of the occupant P2 (so as to be disposed in the lower chamber 32) when the flow straightening cylinder 50 is expanded and deployed. Here, for example, in the child occupant P1 corresponding to the human body dummy of a three-year-old child, the chest faces a position corresponding to the upper partition member 37. That is, the chest of the child occupant P1 faces a position corresponding to the area between the flow straightening cylinder 50 that is branched into two (the area in the center portion in the vehicle width direction in which the flow straightening cylinder 50 is not present).

Therefore, as compared to the case where the flow straightening cylinder 50 is not branched in the vehicle width direction (when the flow straightening cylinder is present in the central portion in the vehicle width direction), the amount of contact of the child occupant P1 through the airbag main body 30 with the flow straightening cylinder 50 having a high internal pressure (the amount of interference overlapping in the front-rear direction in side view) can be reduced. This makes it possible to suppress a load more than necessary from being applied to the child occupant P1, and the injury value for the chest and neck of the child occupant P1 can be reduced.

In addition, since the upper portion branched into two of the expanded and deployed flow straightening cylinder 50 is disposed at a position facing both knees of the adult occupant P2, both knees of the occupant P2 can be effectively restrained by the flow straightening cylinder 50 having a high internal pressure via the airbag main body 30. That is, the knee restraint performance for the adult occupant P2 can be improved. Thus, with the airbag device 20 according to the second embodiment, it is possible to achieve both an improvement in the restraint performance for the child occupant P1 and an improvement in the restraint performance for the adult occupant P2.

Furthermore, the flow straightening cylinder 50 is provided to be passed through the pair of right and left openings 37B provided in the upper partition member 37 and to pass through the single opening 35B provided in the lower partition member 35. That is, the position of the flow straightening cylinder 50 is regulated by the upper partition member 37 and the lower partition member 35. This makes it possible to suppress the deployment behavior of the flow straightening cylinder 50 from becoming unstable when the gas is supplied instantaneously to expand and deploy the flow straightening cylinder 50 (the deployment behavior of the flow straightening cylinder 50 can be stabilized).

The upper chamber 38 is provided with the holding member 58 having the through holes 58A through which the upper end portions 50U of the flow straightening cylinder 50 are inserted. This makes it possible to suppress the deployment behavior of the upper end portions 50U of the flow straightening cylinder 50 from becoming unstable when the gas is supplied instantaneously to expand and deploy the flow straightening cylinder 50.

The flow straightening cylinder 50 is configured by superimposing two base fabrics formed in a substantial "Y" shape in front view and sewing the perimeter except for the opening 52A and the openings 56A that are gas vents. That is, the flow straightening cylinder 50 is manufactured by inexpensive plane sewing (sewing two sheets of base fabric together). Therefore, the manufacturing process of the flow straightening cylinder 50 can be simplified, and its manufacturing cost can be reduced.

The vehicle passenger seat airbag device 20 according to the present embodiment has been described above with reference to the drawings, but the vehicle passenger seat airbag device 20 according to the present embodiment is not limited to the illustrated embodiments and its design can be changed as appropriate within the scope of the present disclosure. For example, the substantially rectangular flat shape in the first embodiment includes an inflated shape (substantially drum shape) in which the center portion in the vehicle width direction bulges slightly in a substantially arc shape toward the front side and the rear side.

Further, the first plane panel 26 constituting the airbag main body 30 is not limited to the first plane panel in which the circumference along the vertical direction is shortened by tuck sewing, and may be set (formed) short in advance. Furthermore, the inflator 24 may be configured to be activated not only when a frontal collision of the vehicle 10 is detected, but also when a frontal collision of the vehicle 10 is predicted, for example, by a collision prediction sensor or the like.

What is claimed is:

1. A vehicle passenger seat airbag device comprising:
   an airbag main body that is stored on a lower side of an instrument panel and configured to be located in front of an area from a knee to a shin of an occupant seated in a passenger seat of a vehicle, and that is partitioned by an upper partition member into a lower chamber configured to restrain a lower limb of the occupant and an upper chamber configured to restrain an upper body of the occupant; and
   a flow straightening cylinder that is provided so as to be passed through the upper partition member inside the airbag main body and that distributes gas ejected from an inflator to the lower chamber and the upper chamber, wherein the flow straightening cylinder has a first length in a front-rear direction at a first central portion in a vehicle width direction in a region passing through the upper partition member, the first length is shorter than a portion other than the first central portion when the flow straightening cylinder expands and deploys due to ejection of the gas.

2. The vehicle passenger seat airbag device according to claim 1, wherein
   the lower chamber is partitioned into a first lower chamber and a second lower chamber by a lower partition member, and
   the flow straightening cylinder is also provided so as to be passed through the lower partition member, and has a second length in the front-rear direction at a second central portion in the vehicle width direction in a region passing through the lower partition member, the second length is shorter than a portion other than the second central portion when the flow straightening cylinder expands and deploys due to ejection of the gas.

3. The vehicle passenger seat airbag device according to claim 1, further comprising a tether attached to the flow straightening cylinder that regulates the first length of the first central portion in the front-rear direction.

4. The vehicle passenger seat airbag device according to claim 1, wherein the flow straightening cylinder is provided so as to form a curved shape along an outer shape of a rear surface of the instrument panel when the flow straightening cylinder expands and deploys due to the ejection of the gas.

5. The vehicle passenger seat airbag device according to claim 1, wherein the airbag main body includes a first plane panel disposed on an instrument panel side and a second plane panel disposed on an occupant side, and a circumference along a vertical direction of the first plane panel is set to be shorter than a circumference along a vertical direction of the second plane panel.

6. The vehicle passenger seat airbag device according to claim 1, wherein an opening is provided in the upper partition member, and a gap is formed between a peripheral edge portion of the opening and an outer peripheral surface in the first central portion in at least the region passing through the upper partition member.

7. The vehicle passenger seat airbag device according to claim 1, further comprising a right tether and a left tether attached to the flow straightening cylinder that regulate the first length of the first central portion in the front-rear direction.

* * * * *